(12) United States Patent
Choi

(10) Patent No.: US 9,892,035 B2
(45) Date of Patent: Feb. 13, 2018

(54) MEMORY SYSTEM FOR STORING DATA CORRESPONDING TO LOGICAL ADDRESSES INTO PHYSICAL LOCATION ACCESSIBLE USING INTERLEAVING, AND OPERATION METHOD THEREOF

(71) Applicant: SK hynix Inc., Gyeonggi-do (KR)

(72) Inventor: Hae-Gi Choi, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 14 days.

(21) Appl. No.: 15/204,483

(22) Filed: Jul. 7, 2016

(65) Prior Publication Data

US 2017/0220465 A1 Aug. 3, 2017

(30) Foreign Application Priority Data

Feb. 1, 2016 (KR) ........................ 10-2016-0012402

(51) Int. Cl.
*G11C 8/00* (2006.01)
*G06F 12/06* (2006.01)
*G06F 3/06* (2006.01)
*G06F 11/16* (2006.01)
*G06F 12/02* (2006.01)

(52) U.S. Cl.
CPC ........ *G06F 12/0607* (2013.01); *G06F 3/0604* (2013.01); *G06F 3/0659* (2013.01); *G06F 3/0679* (2013.01); *G06F 12/0246* (2013.01); *G06F 11/1666* (2013.01); *G06F 12/02* (2013.01); *G06F 2212/1016* (2013.01); *G06F 2212/65* (2013.01); *G06F 2212/7201* (2013.01); *G06F 2212/7208* (2013.01)

(58) Field of Classification Search
CPC .. G06F 12/0607; G06F 3/0604; G06F 3/0659; G06F 3/0679; G06F 2212/1016; G06F 2212/65; G06F 11/1666; G06F 12/02; G06F 12/0246; G06F 2212/7208; G06F 2212/7201
USPC ............ 711/157, 5, 154; 365/230.04, 230.03
See application file for complete search history.

(56) References Cited

U.S. PATENT DOCUMENTS

| | | | | |
|---|---|---|---|---|
| 2008/0271054 | A1* | 10/2008 | Allison | ............... G06F 11/1666 719/319 |
| 2010/0332718 | A1 | 12/2010 | Farrell et al. | |
| 2012/0102379 | A1* | 4/2012 | D'Abreu | ............. G06F 11/1072 714/763 |
| 2016/0342343 | A1* | 11/2016 | Yen | ......................... G06F 12/02 |
| 2017/0060424 | A1* | 3/2017 | Choi | ..................... G06F 3/0604 |
| 2017/0109090 | A1* | 4/2017 | Chun | ..................... G06F 3/0625 |
| 2017/0177494 | A1* | 6/2017 | Choi | ....................... G06F 12/10 |

* cited by examiner

*Primary Examiner* — Hong Kim
(74) *Attorney, Agent, or Firm* — IP & T Group LLP

(57) ABSTRACT

A memory system supporting an interleaving operation including: a plurality of memory devices; and a controller suitable for detecting whether, among a plurality of logical address groups inputted to perform a read or write operation in the plurality of memory devices, first logical address groups having values related to each other are inputted, and for adjusting, when physical storage locations of data corresponding to logical addresses of the first logical address groups are inaccessible using interleaving, the physical storage locations of the data to locations that are accessible using interleaving and store the data in adjusted locations.

20 Claims, 17 Drawing Sheets

MEMORY SYSTEM FOR STORING DATA CORRESPONDING TO LOGICAL ADDRESSES INTO PHYSICAL LOCATION ACCESSIBLE USING INTERLEAVING, AND OPERATION METHOD THEREOF

CROSS-REFERENCE TO RELATED APPLICATION

This application claims priority under 35 U.S.C. § 119(a) to Korean Patent Application No. 10-2016-0012402 filed on Feb. 1, 2016 in the Korean Intellectual Property Office, which is incorporated herein by reference in its entirety.

TECHNICAL FIELD

Exemplary embodiments relate to a semiconductor design technology and, more particularly, to a memory system supporting an interleaving operation, and an operating method thereof.

DISCUSSION OF THE RELATED ART

The computer environment paradigm has shifted to ubiquitous computing systems that can be used anywhere and anytime. As a result use of portable electronic devices, such as mobile phones, digital cameras, and notebook computers has been increasing rapidly. These portable electronic devices may use a memory system having a memory device for storing data. A memory system may be used as a main or an auxiliary memory of a portable electronic device.

Memory systems using semiconductor memory devices provide excellent stability, durability, high information access speed, and low power consumption since they have no moving parts. Examples of memory systems having such advantages include universal serial bus (USB) memories, memory cards having various interfaces, and solid state drives (SSD).

SUMMARY

Various embodiments are directed to a memory system capable of storing data corresponding to logical addresses that are frequently requested from a host, in a physical location that is accessible using interleaving, and an operating method of the memory system.

In an embodiment, a memory system may include: a plurality of memory devices; and a controller suitable for detecting whether, among a plurality of logical address groups inputted to perform a read or write operation in the plurality of memory devices, first logical address groups having values related to each other are inputted, and for adjusting, when physical storage locations of data corresponding to logical addresses of the first logical address groups are inaccessible using interleaving, the physical storage locations of the data to locations that are accessible using interleaving and store the data in adjusted locations.

Each of the plurality of logical address groups: may correspond to one read command or one write command; and may include an A number of successive logical addresses, wherein a value of the A varies depending on a size of corresponding data.

The controller may include: a command queue suitable for storing read commands or write commands and logical address groups corresponding thereto in an input sequence of the read commands or write commands up to a number of B, wherein the B is an integer of 2 or more; and a detection logic table suitable for storing the first logical address groups up to a number of C, wherein the C is an integer of 2 or more. The controller may check, each time a new read command is stored in the command queue, whether a new logical address group corresponding to the new read command has related values to the logical address groups already stored in the command queue, sets the new logical address group as a new detected logical address group when the new logical address group has related values, and stores the new detected logical address group as the first logical address group in the detection logic table.

The controller may store the first logical address groups and respective iterative detection counts thereof in the detection logic table up to the number of C, and when the new detected logical address group has related values to the first logical address groups, the controller may increase an iterative detection count of corresponding one among the first logical address groups without storing the new detected logical address group in the detection logic table.

The controller: may select, in an entry period of a standby or background operation mode, a second logical address group, the iterative detection count of which is equal to or greater than a preset count among the first logical address groups; may check whether physical storage locations of an A number of data corresponding to an A number of logical addresses included in the second logical address group are accessible using interleaving; and may adjust, when the physical storage locations are inaccessible using interleaving as a result of the checking, the physical storage locations of the A number of data corresponding to the second logical address group to locations that are accessible using interleaving, and restores the data in adjusted locations.

The controller may include a logic table suitable for storing the plurality of logical address groups in an input sequence thereof up to a number of E, wherein the E is an integer of 2 or more; and a detection logic table suitable for storing the first logical address groups up to a number of F, wherein the F is an integer of 2 or more. The controller may check, each time a new logical address group is stored in the logic table, whether the new logical address group has related values to the logical address groups stored in the logic table, sets the new logical address group as a new detected logical address group when the new logical address group has the related values, and stores the new detected logical address group as the first logical address groups in the detection logic table.

The controller may store the first logical address groups and respective iterative detection counts thereof in the detection logic table up to the number of F, and when the new detected logical address group has related values to the first logical address groups, the controller may increase an iterative detection count of corresponding one among the first logical address groups without storing the new detected logical address group in the detection logic table.

The controller: may select, in an entry period of a standby or background operation mode, a second logical address group, the iterative detection count of which is equal to or greater than a preset count among the first logical address group; may check whether physical storage locations of an A number of data corresponding to an A number of logical addresses included in the second logical address group is accessible using interleaving, and may adjust, when the physical storage locations are inaccessible using interleaving as a result of the checking, the physical storage locations of the A number of data corresponding to the second logical address group to locations that are accessible using interleaving, and restores the data in adjusted locations.

The controller: may detect a G number of logical address groups that are successively inputted and stored in the detection logic table and have iterative detection counts greater than a preset count in an entry period of a standby or back ground operation mode, wherein the G is an integer of 2 or more; may check whether physical storage locations of a G*A number of data corresponding to a G*A number of logical addresses included in the G number of logical address groups are accessible using interleaving; and may adjust, when the physical storage locations are inaccessible using interleaving as a result of the checking, the physical storage locations of the G*A number of data corresponding to the G number of logical address groups to locations that are accessible using interleaving, and restores the data in adjusted locations.

The controller may determine that the first logical address groups have values related to each other: when start logical addresses of the first logical address groups have the same value, and sizes of data of the first logical address groups are the same as each other; or when a part or all of logical addresses included in the first logical address groups completely match each other.

In an embodiment, a method of operating a memory system including a plurality of memory devices, may include: detecting whether, among a plurality of logical address groups inputted to perform a read or write operation in the plurality of memory devices, first logical address groups having values related to each other are inputted; and adjusting, when physical storage locations of data corresponding to logical addresses of the first logical address groups are inaccessible using interleaving, the physical storage locations of the data to locations that are accessible using interleaving, and storing the data in adjusted locations.

Each of the plurality of logical address groups: may correspond to one read command or one write command; and may include an A number of successive logical addresses, wherein a value of the A varies depending on a size of corresponding data.

The memory system may further include: a command queue suitable for storing read commands or write commands and logical address groups corresponding thereto in an input sequence of the read commands or write commands up to a number of B, wherein the B is an integer of 2 or more; and a detection logic table suitable for storing the first logical address groups up to a number of C, wherein the C is an integer of 2 or more. The detecting of the first logical address groups may include: checking, each time a new read command is stored in the command queue, whether a new logical address group corresponding to the new read command has related values to the logical address groups stored in the command queue; setting the new logical address group as a new detected logical address group when the new logical address group has the related values; and storing the new detected logical address group as the first logical address groups in the detection logic table.

The detection logic table may store the first logical address groups and respective iterative detection counts thereof up to the number of C, and the storing of the new detected logical address group may include increasing, when the new detected logical address group has related values to the first logical address groups, an iterative detection count of corresponding one among the first logical address groups, without adding the new detected logical address group to the detection logic table.

The adjusting and storing may include: selecting, in an entry period of a standby or background operation mode, a second logical address group, the iterative detection count of which is equal to or greater than a preset count among the first logical address groups; checking whether physical storage locations of an A number of data corresponding to an A number of logical addresses included in the second logical address group are accessible using interleaving; and adjusting, when the physical storage locations are inaccessible using interleaving as a result of the checking, the physical storage locations of the A number of data corresponding to the second logical address group to locations that are accessible using interleaving, and restoring the data in adjusted locations.

The memory system may further include: a logic table suitable for storing the plurality of logical address groups in an input sequence thereof up to a number of E, wherein the E is an integer of 2 or more; and a detection logic table suitable for storing the first logical address groups up to a number of F, wherein the F is an integer of 2 or more. The detecting of the first logical address groups may include: checking, each time a new logical address group is stored in the logic table, whether the new logical address group has related values to the logical address groups stored in the logic table; setting the new logical address group as a new detected logical address group when the new logical address group has the related values; and storing the new detected logical address group as the first logical address groups in the detection logic table.

The detection logic table may store the first logical address groups and respective iterative detection counts thereof up to the number of F, the storing of the new detected logical address group may include increasing, when the new detected logical address group has related value to the first logical address groups, an iterative detection count of corresponding one among the first logical address groups, without adding the new detected logical address group to the detection logic table.

The adjusting and storing may include: selecting, in an entry period of a standby or background operation mode, a second logical address group, the iterative detection count of which is equal to or greater than a preset count among the first logical address groups; checking whether physical storage locations of an A number of data corresponding to an A number of logical addresses included in the second logical address group are accessible using interleaving; and adjusting, when the physical storage locations are inaccessible using interleaving as a result of the checking, the physical storage locations of the A number of data corresponding to the second logical address group to locations that are accessible using interleaving, and restoring the data in adjusted locations.

The adjusting and storing may include: detecting a G number of logical address groups that are successively inputted and stored in the detection logic table and have iterative detection counts greater than a preset count in an entry period of a standby or back ground operation mode, wherein the G is an integer of 2 or more; checking whether physical storage locations of a G*A number of data corresponding to a G*A number of logical addresses included in the G number of logical address groups are accessible using interleaving; and adjusting, when the physical storage locations are inaccessible using interleaving as a result of the checking, the physical storage locations of the G*A number of data corresponding to the G number of logical address groups to locations that are accessible using interleaving, and restoring the data in adjusted locations.

The detecting of the first logical address groups may include: determining that the first logical address groups have values related each other: when start logical addresses of the first logical address groups have the same value, and sizes of data of the first logical address groups are the same as each other; or when a part or all of logical addresses included in the first logical address groups completely match each other.

DETAILED DESCRIPTION

Figure 1:
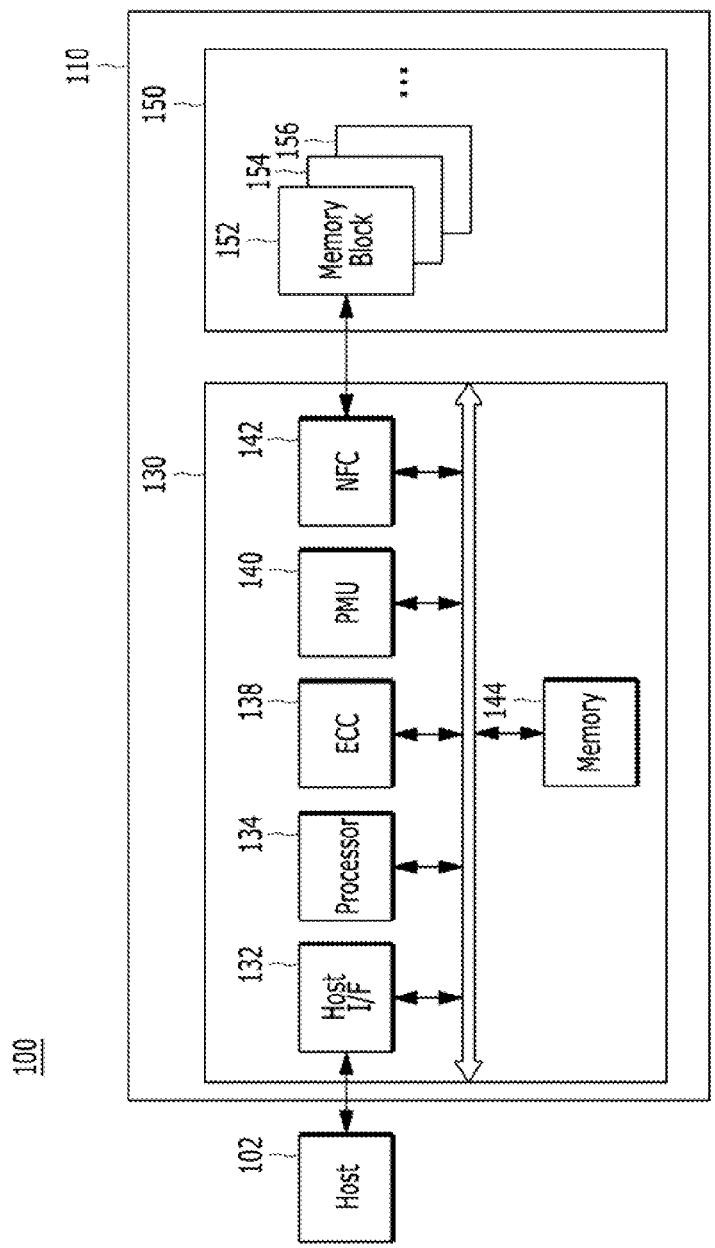
FIG. 1 is a diagram illustrating a data processing system including a memory system, according to an embodiment of the present invention.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may have diverse modifications and embodiments, and herein, some of the embodiments are taken as examples to describe the concept and scope of the present invention. However, it is obvious to those skilled in the art that the embodiments do not limit the concept and scope of the present invention. Also, the constituent elements of the embodiments of the present invention should be understood to include all modifications, substitutes and equivalents. In this respect, the following embodiments shown in FIGS. 1 to 9 which are used to describe the principle of the present invention should be construed not to be restrictive but to be illustrative.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in more detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in more detail with reference to the attached drawings.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
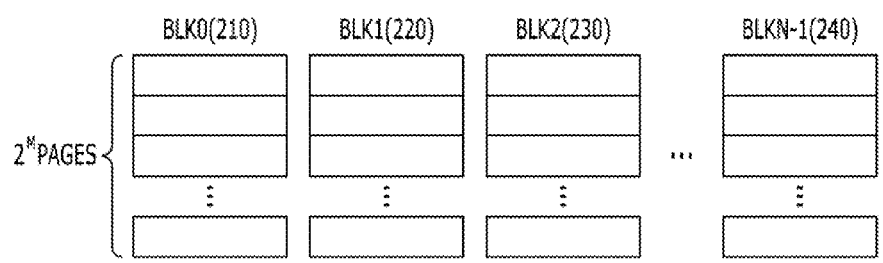
FIG. 2 is a diagram illustrating a memory device including a plurality of memory blocks, according to an embodiment of the present invention.

Referring to FIG. 2 the memory device 150 may include a plurality of memory blocks, for example, zeroth to $(N-1)^{th}$ blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
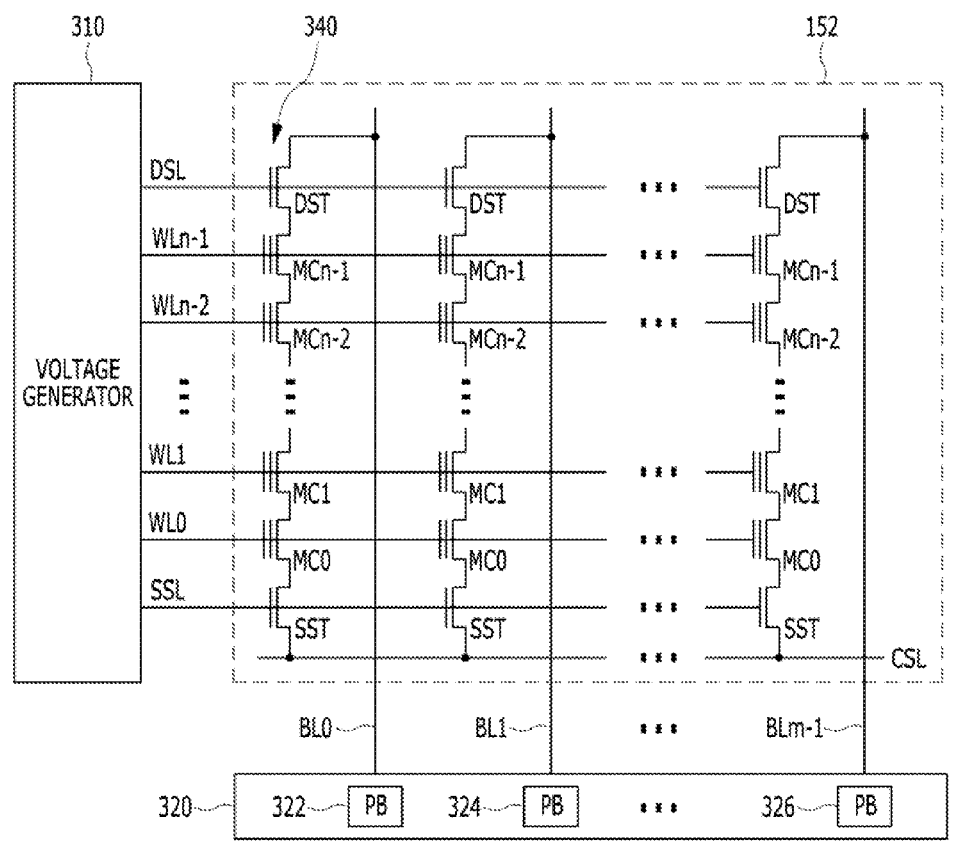
FIG. 3 is a circuit diagram illustrating a memory block of a memory device, according to an embodiment of the present invention.

Referring to FIG. 3, a memory block 152 of the memory device 150 may include a plurality of cell strings 340 coupled electrically to bit lines BL0 to BLm-1, respectively. Each cell string 340 may include at least one drain select transistor DST and at least one source select transistor SST. A plurality of memory cells or a plurality of memory cell transistors MC0 to MCn-1 may be coupled electrically in series between the select transistors DST and SST. The respective memory cells MC0 to MCn-1 may consist of multi-level cells (MLC) each of which stores data information of a plurality of bits. The memory cells may have any suitable architecture.

In FIG. 3, 'DSL' denotes a drain select line, 'SSL' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
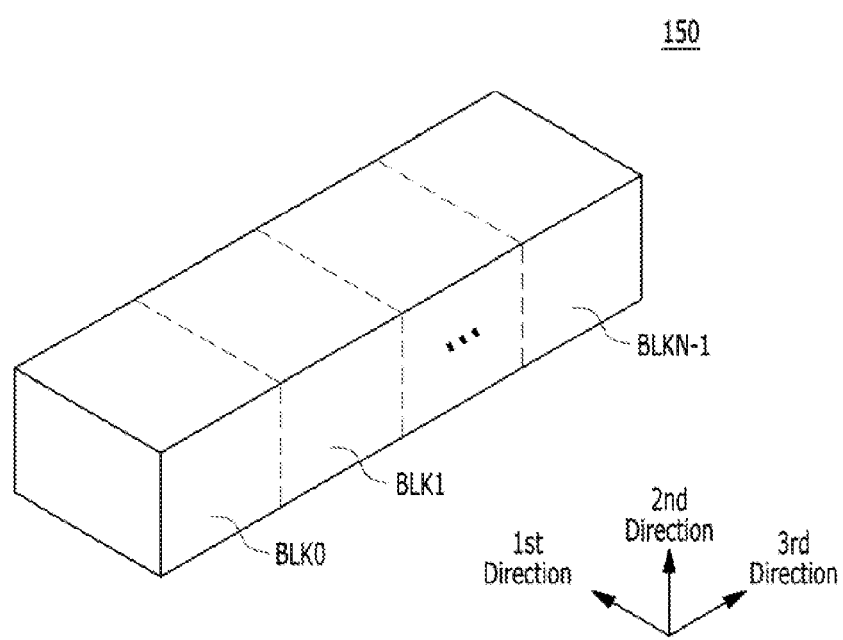
FIGS. 4, 5, 6, 7, 8, 9, 10, and 11 are diagrams schematically illustrating a memory device, according to various embodiments of the present invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN−1. Each of the memory blocks BLK0 to BLKN−1 may be realized in a 3D structure or a vertical structure. The respective memory blocks BLK0 to BLKN−1 may include a plurality of structures extending in first to third directions, for example, an x-axis direction, a y-axis direction and a z-axis direction.

Figure 8:
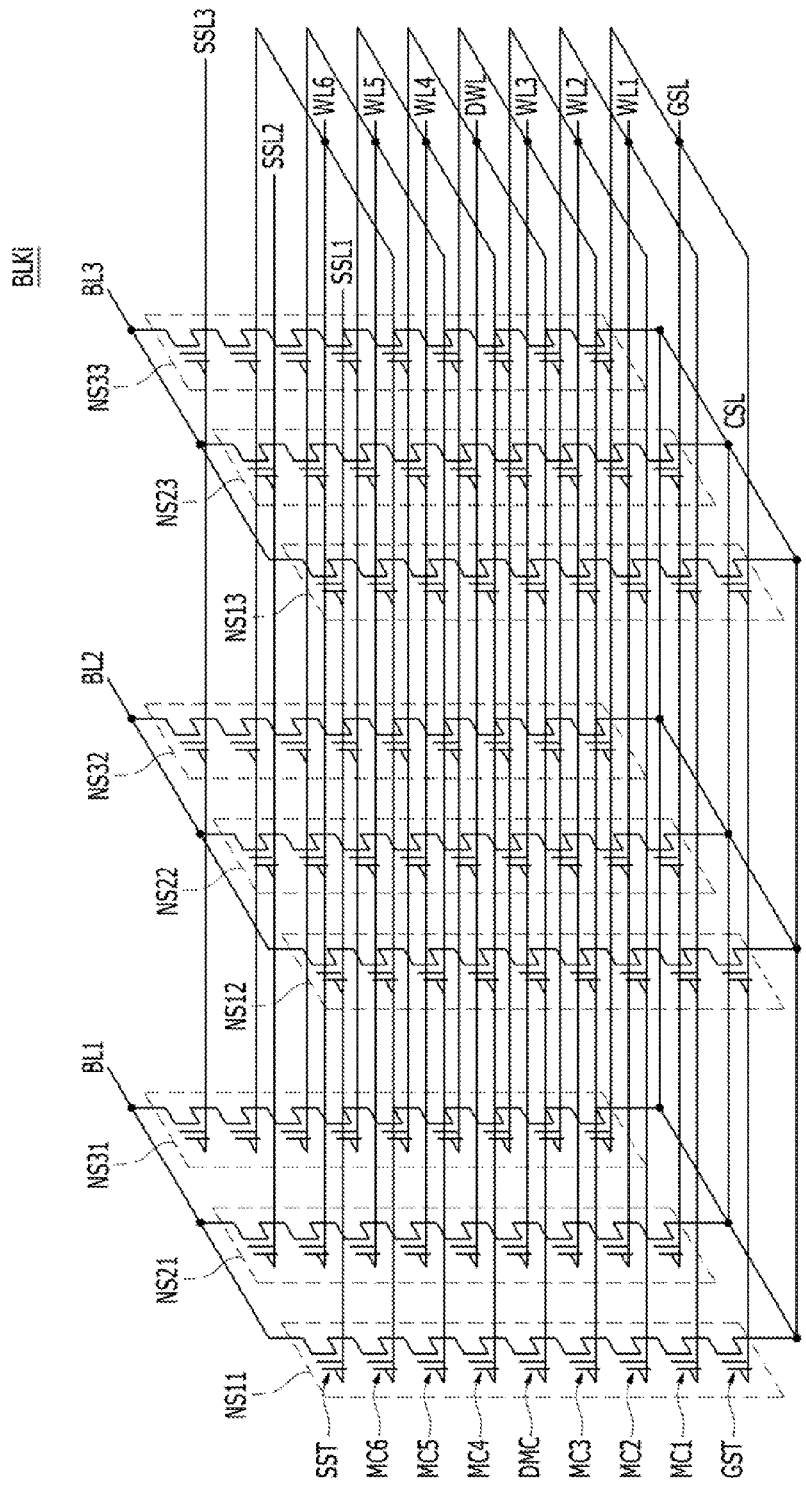

The respective memory blocks BLK0 to BLKN−1 may include a plurality of NAND strings NS extending in the second direction (FIG. 8). The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
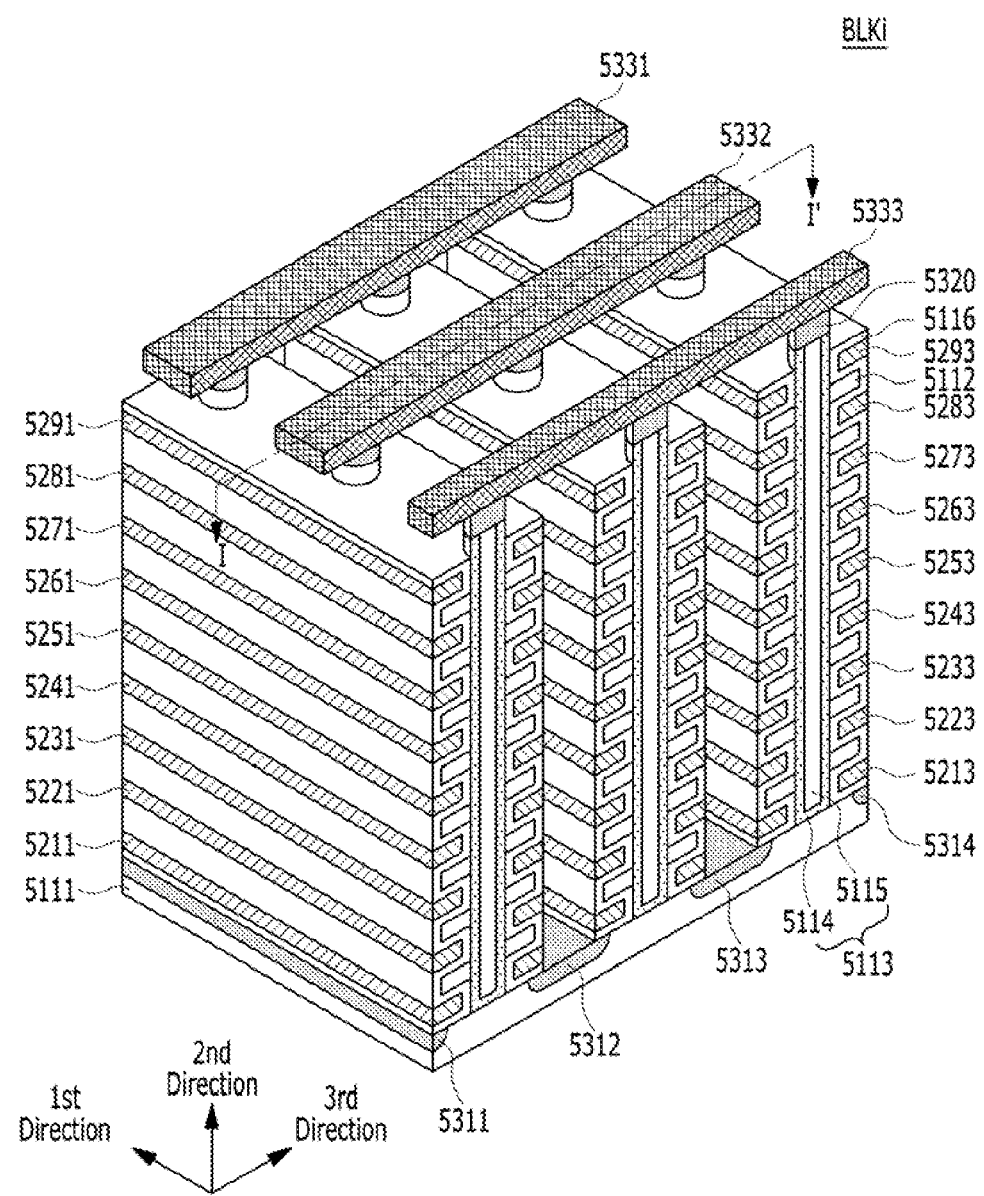
Figure 6:
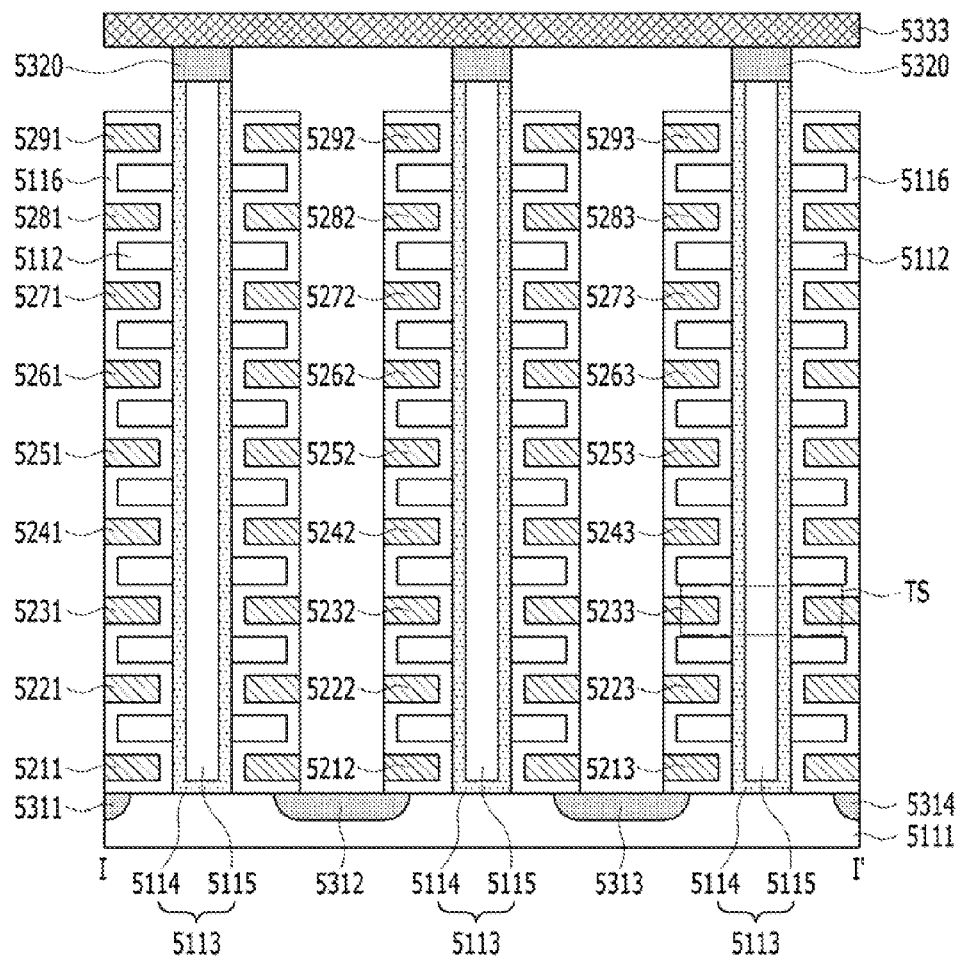

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction using interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon, it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
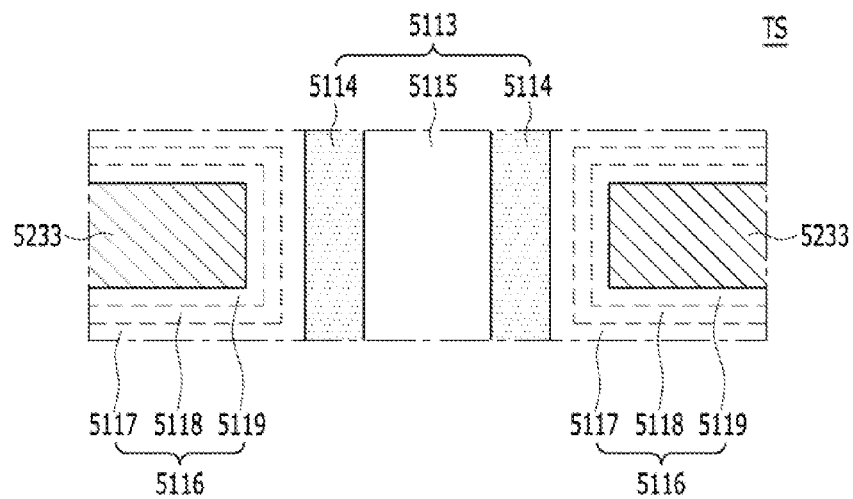

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In more detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one-bit line BL, it is noted that the embodiment is not limited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected.

Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
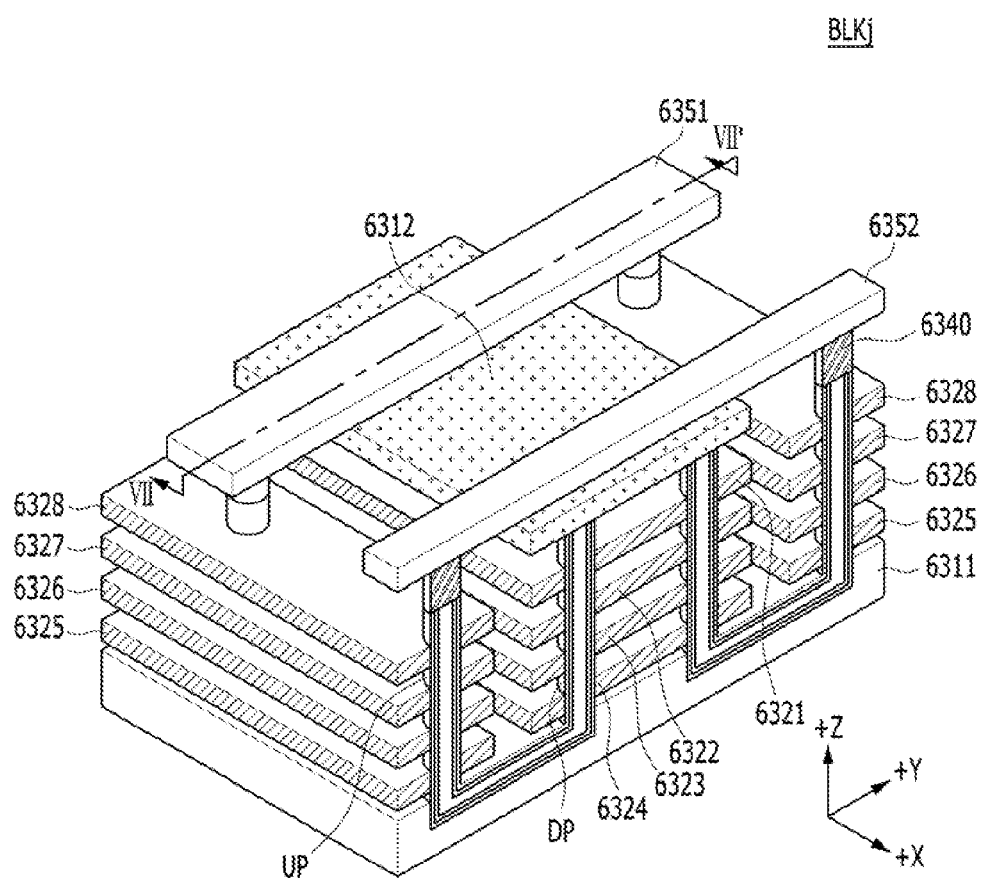

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
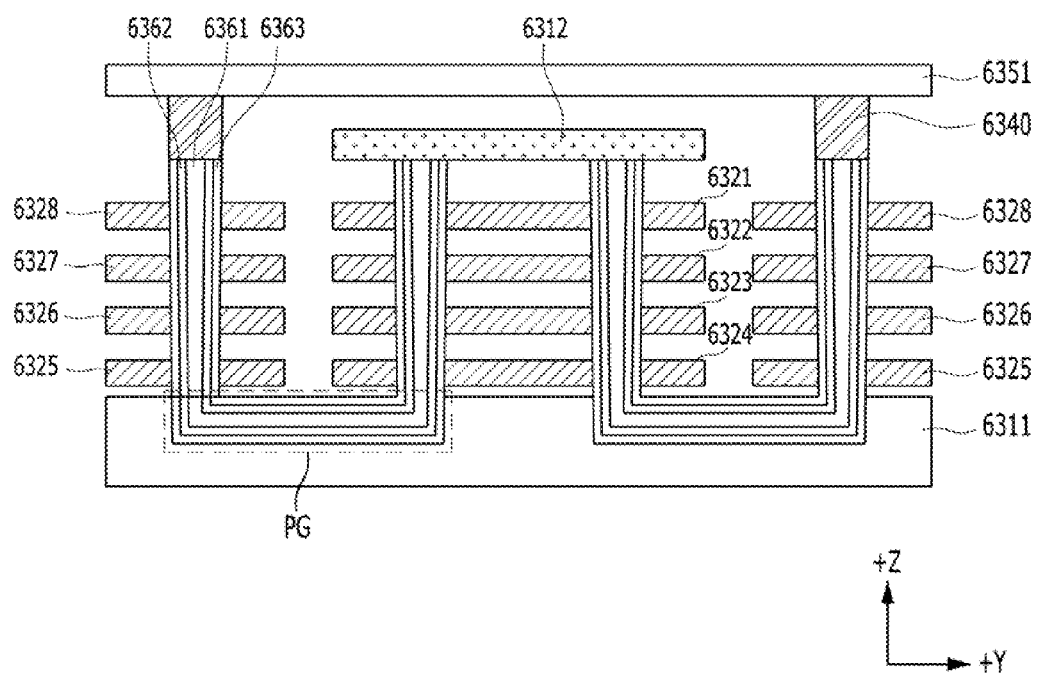

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in more detail with reference to FIG. 7, a detailed description thereof will be omitted herein.

Figure 11:
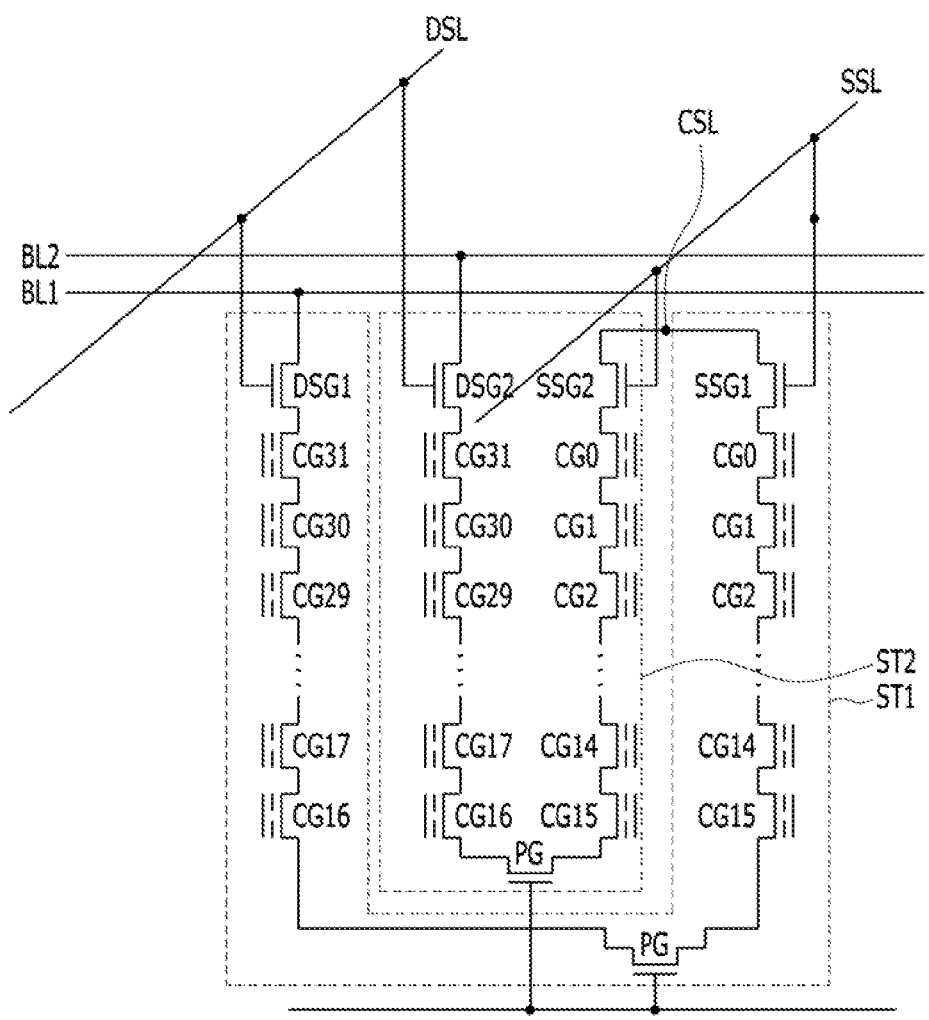

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Figure 12:
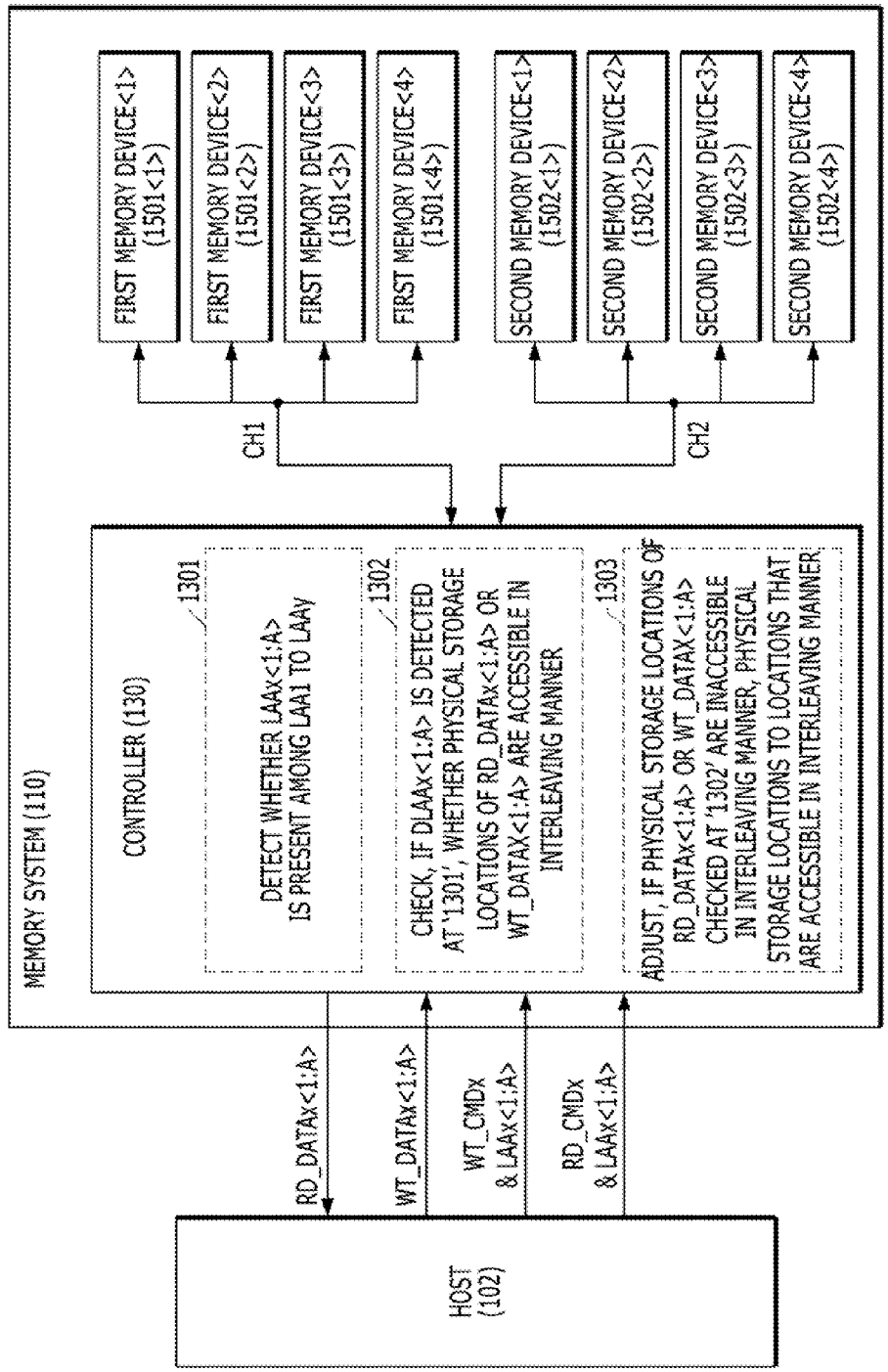
FIG. 12 is a block diagram illustrating a memory system including a plurality of memory devices, according to an embodiment of the present invention.

FIG. 12 is a block diagram illustrating a memory system 110, according to an embodiment of the present invention.

According to the embodiment of FIG. 12, the memory system 110 is provided with reference to the configuration of the memory system 110 shown in FIG. 1. The memory system 110 may include a plurality of memory devices divided in a plurality of first memory devices 1501 and a plurality of second memory devices 1502. Specifically, FIG. 12 illustrates that the plurality of first memory devices 1501 and the plurality of second memory devices 1502 include four memory devices 1501<1:4> and 1502<1:4>, respectively. It is noted, that the number of memory devices may vary. For example, more or fewer memory devices may be included as the plurality of first memory devices 1501 or the plurality of second memory devices 1502.

Also, as illustrated in FIG. 12, the plurality of first memory devices 1501<1:4> are coupled to the controller 130 through a first channel CH1, and the plurality of second memory devices 1502<1:4> are coupled to the controller 130 through a second channel CH2.

The plurality of first memory devices 1501<1:4> and the plurality of second memory devices 1502<1:4> may be operated in an interleaving.

It is noted that the configuration of FIG. 12, in which the plurality of first memory devices 1501<1:4> and the plurality of second memory devices 1502<1:4> are coupled through the different channels CH1 and CH2 and operated using interleaving is only one embodiment. According to a different circuit design, the plurality of first memory devices 1501<1:4> and the plurality of second memory devices 1502<1:4> may be coupled in a different and still being operable using interleaving.

In operation, host 102 may transmit a read command and a logical address group RD_CMDx & LAAx<1:A> or a write command and logical address group WT_CMDx & LAAx<1:A> to the memory system for performing a read or a write operation, respectively, in at least one of the plurality of memory devices 1501<1:4> and 1502<1:4> of the memory system 110.

In this regard, the logical address group LAAx<1:A> may correspond to a single read command RD_CMDx or a single write command WT_CMDx, and may represent a group of 'A' number of logical addresses LAAx<1:A>. The 'A' number of logical addresses LAAx<1:A> included in the single logical address group LAAx<1:A> have successive values. The size of 'A' may be variable. This is because the size of read data RD_DATAx<1:A> or write data WT_DATAx<1:A> requested through a single read command RD_CMDx or a single write command WT_CMDx may vary each time. For example, if the size of the read data RD_DATAx<1:A> requested to be read through the read command RD_CMDx is '64 Kbyte' and the size of the write data WT_DATAx<1:A> requested to be written through the write command WT_CMDx is '32 Kbyte', 'A' in the logical address group LAAx<1:A> inputted along with the write command WT_CMDx will be less than 'A' in the logical address group LAAx<1:A> inputted along with the read command RD_CMDx. That is, 'A' in the logical address group LAAx<1:A> inputted along with the read command RD_CMDx may be '8', and 'A' in the logical address group LAAx<1:A> inputted along with the write command WT_CMDx may be '4'.

The memory system 110 may read, in response to the read command and logical address group RD_CMDx & LAAx<1:A>, read data RD_DATAx<1:A> stored in the plurality of memory device 1501<1:4> and 1502<1:4> and outputs it to the host 102. Furthermore, the memory system 110 stores, in response to the write command and logical address group WT_CMDx & LAAx<1:A>, write data WT_DATAx<1:A> inputted from the host 102 in the plurality of memory device 1501<1:4> and 1502<1:4>.

The controller 130 detects whether, among a plurality of logical address groups LAA1 to LAAy inputted to perform a read or write operation in the plurality of memory devices 1501<1:4> and 1502<1:4>, logical address groups LAAx<1:A> having values related to each other are inputted (see '1301').

In this regard, the controller 130 uses the following criteria when determining whether logical address groups LAAx<1:A> having values related to each other are present among the plurality of logical address groups LAA1 to LAAy.

First, the controller 130 may determine logical address groups LAAx<1:A> having the same start logical address and data size. For example, when first and second logical address groups LAA1<1:A> and LAA2<1:A> are inputted among the plurality of logical address groups LAA1 to LAAy, start logical addresses LAA1<1> and LAA2<1> of the first and second logical address groups LAA1<1:A> and LAA2<1:A> have the same value, and the sizes of data corresponding to the first and second logical address groups LAA1<1:A> and LAA2<1:A> are the same. That is, 'A' in the first logical address group LAA1<1:A> and 'A' in the second logical address group LAA2<1:A> have the same value, and the first logical address group LAA1<1:A> and the second logical address group LAA2<1:A> may be determined to have values related to each other.

Second, in the case where, among the plurality of logical address groups LAA1 to LAAy, respective values of the 'A' number of logical addresses included in a third logical address group LAA3<1:A> and respective values of the 'A' number of logical addresses included in a fourth logical address group LAA4<1:A> completely match each other, the third logical address group LAA3<1:A> and the fourth logical address group LAA4<1:A> may be determined to have values related to each other.

Third, among the plurality of logical address groups LAA1 to LAAy, 'a fifth logical address group LAA5<1:8> and 'a sixth logical address group LAA6<1:5> may be inputted. That is, the sizes of data corresponding to the fifth and sixth logical address groups LAA5<1:8> and LAA6<1:5> are different. However, in the case where respective values of first to fifth logical addresses LAA5<1:5> of the fifth logical address group LAA5<1:8> and respective values of first to fifth logical addresses LAA6<1:5> included in the sixth logical address group LAA6<1:5> completely match each other, the fifth logical address group LAA5<1:8> and the sixth logical address group LAA6<1:5> may be determined to have values related to each other.

Reference character 'y' represents the maximum number of logical address groups LAA1 to LAAy that can be managed by the controller 130. Furthermore, character 'x' represents an integer ranging from '1' to 'y'. For example, if the controller 130 can manage one hundred logical address groups LAA1 to LAA100, 'y' will be 100, and 'x' will be any one of values ranging from 1 to 100.

The controller 130 checks, in the case where there is a detected logical address group DLAAx<1:A> in operation '1301', whether a physical storage location of read data RD_DATAx<1:A> or write data WT_DATAx<1:A> corresponding to the detected logical address group DLAAx<1:A> is accessible using interleaving (see '1302').

In this regard, since an 'A' number of logical addresses DLAAx<1:A> are included in the detected logical address group DLAAx<1:A>, an 'A' number of read data RD_DATAx<1:A> or an 'A' number of write data WT_DATAx<1:A> correspond to the detected logical address group DLAAx<1:A>.

In the case where all of the 'A' number of data RD_DATAx<1:A> or WT_DATAx<1:A> corresponding to the detected logical address group DLAAx<1:A> are stored in the plurality of first memory devices 1501<1:4> or the plurality of second memory devices 1502<1:4>, the 'A' number of data RD_DATAx<1:A> or WT_DATAx<1:A> corresponding to the detected logical address group DLAAx<1:A> may be regarded as inaccessible using interleaving.

On the contrary, in the case where the 'A' number of data RD_DATAx<1:A> or WT_DATAx<1:A> corresponding to the detected logical address group DLAAx<1:A> are appropriately distributed and stored in the plurality of first memory devices 1501<1:4> and the plurality of second memory devices 1502<1:4>, the 'A' number of data RD_DATAx<1:A> or WT_DATAx<1:A> corresponding to the detected logical address group DLAAx<1:A> may be regarded as accessible using interleaving.

The controller 130 may check whether physical storage locations of the 'A' number of data RD_DATAx<1:A> or WT_DATAx<1:A> corresponding to the detected logical address group DLAAx<1:A> are accessible using interleaving because the controller 130 has address mapping information of logical addresses and physical addresses.

The controller 130 adjusts, in the case where the physical storage locations of the 'A' number of data RD_DATAx<1:A> or WT_DATAx<1:A> checked at '1302' are inaccessible using interleaving, the physical storage locations to locations that are accessible using interleaving (see '1303').

For example, when it is checked that all of the 'A' number of data RD_DATAx<1:A> or WT_DATAx<1:A> are stored in the plurality of first memory devices 1501<1:4> or the plurality of second memory devices 1502<1:4>, the controller 130 adjusts the storage locations of the data RD_DATAx<1:A> or WT_DATAx<1:A> such that the 'A' number of data RD_DATAx<1:A> or WT_DATAx<1:A> corresponding to the detected logical address group DLAAx<1:A> can be appropriately distributed in the plurality of first memory devices 1501<1:4> and the plurality of second memory devices 1502<1:4>.

Figure 13A:
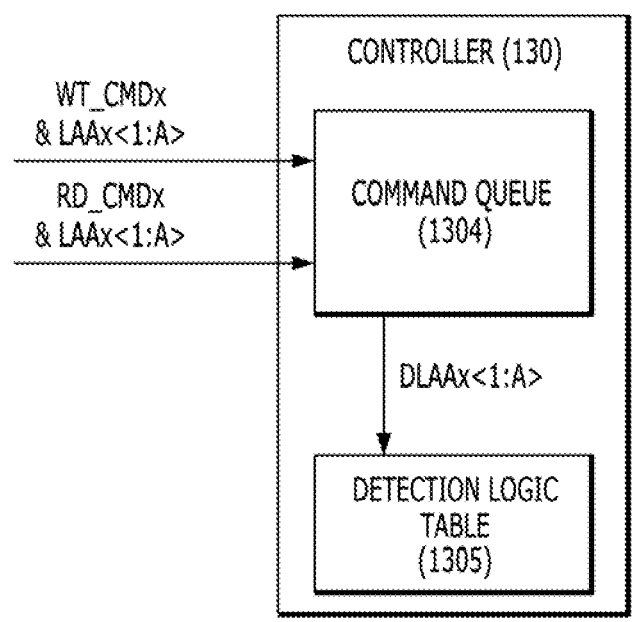
FIGS. 13A to 13C are diagrams describing a detailed operation of a controller in the memory system of FIG. 12, according to an embodiment of the present invention.
Figure 13B:
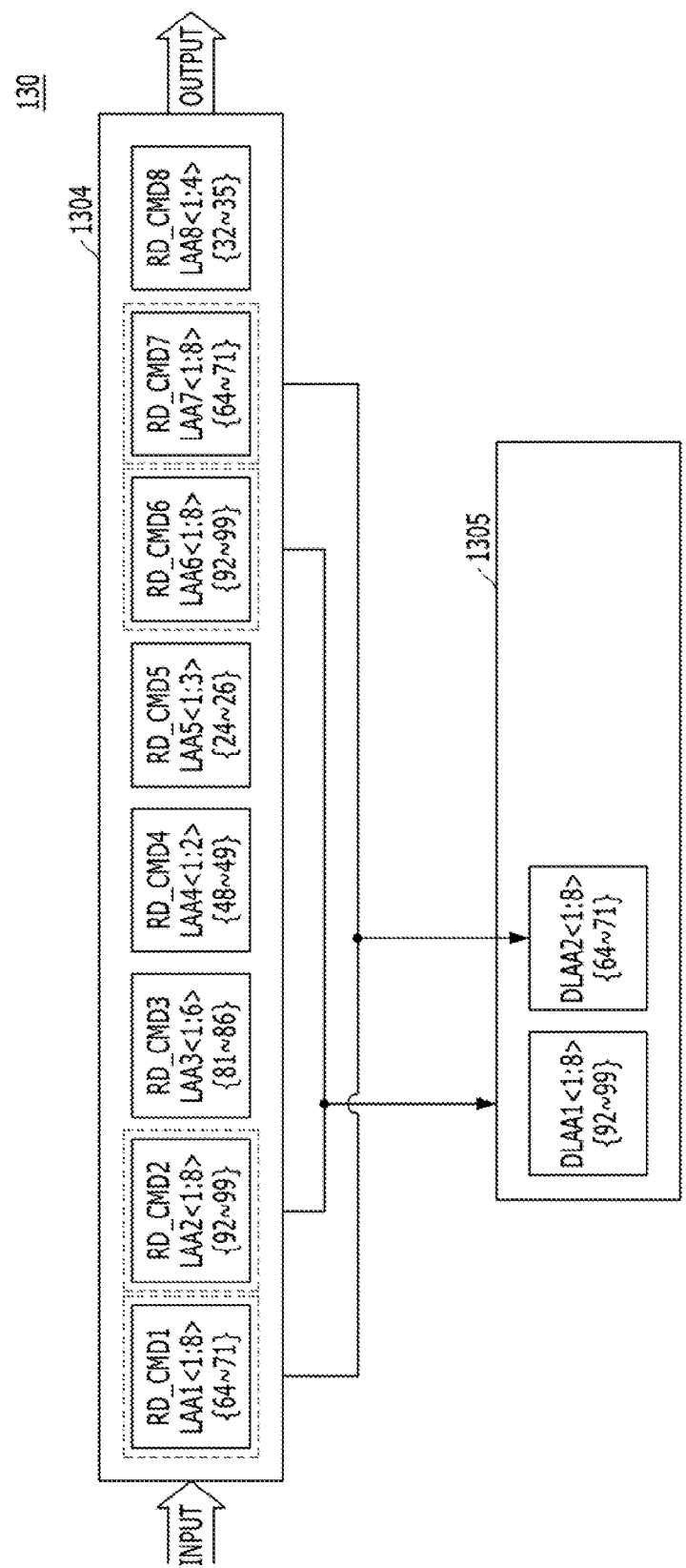
Figure 13C:
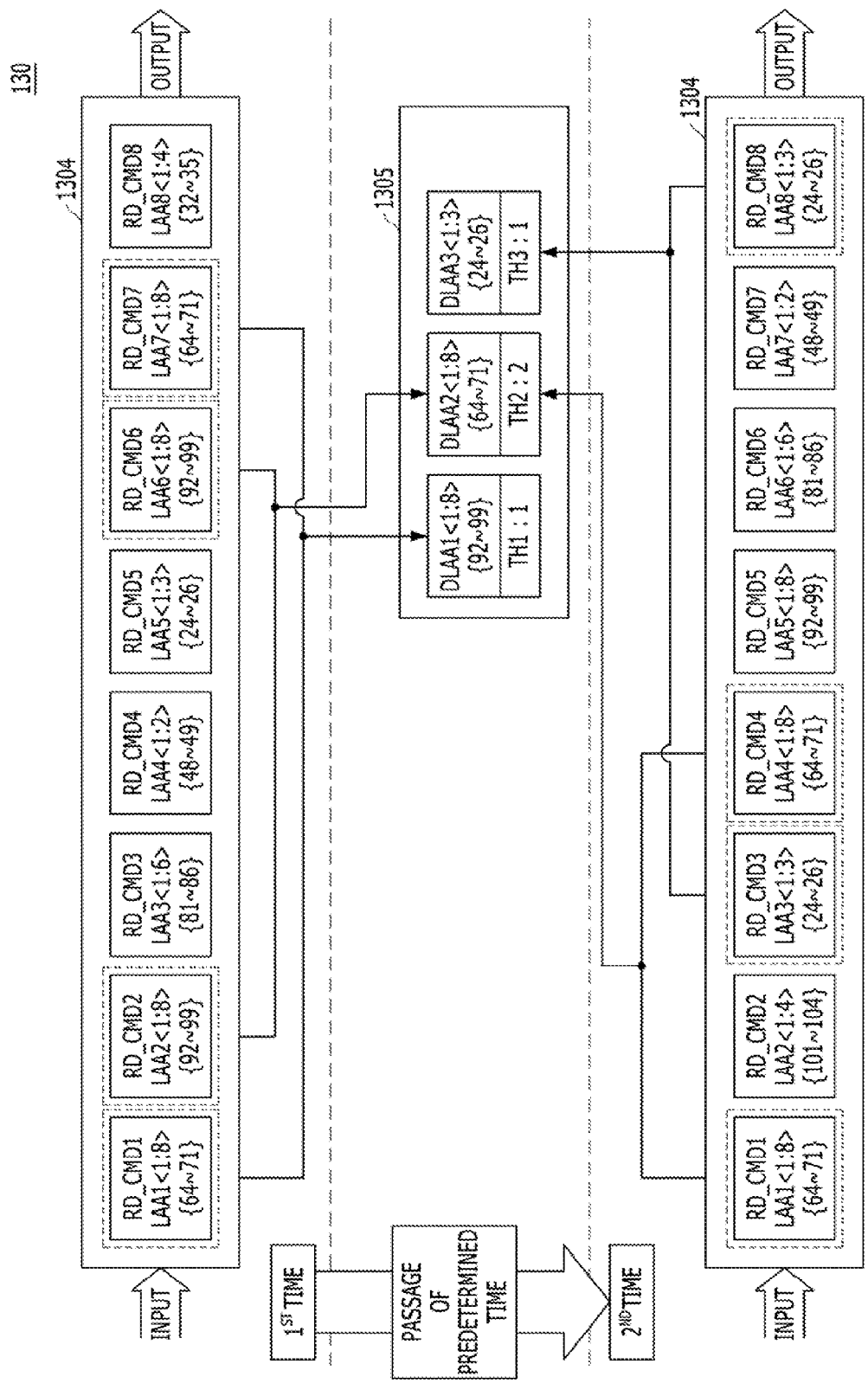

FIGS. 13A to 13C are diagrams describing a detailed operation of the controller 130 in the memory system 110 of FIG. 12, according to an embodiment of the present invention.

Referring to FIG. 13A, the controller 130 may include a command queue 1304 and a detection logic table 1305.

The command queue 1304 may store read commands RD_CMDx or write commands WT_CMDx up to a maximum number of 'B', in an input sequence of the commands RD_CMDx or WT_CMDx. The plurality of logical address groups LAAx<1:A> respectively correspond to a plurality of read and write commands RD_CMDx and WT_CMDx stored in the command queue 1304. That is, the logical address groups LAAx<1:A> along with the plurality of commands RD_CMDx and WT_CMDx are stored in the command queue 1304 up to the maximum number of 'B'.

The detection logic table 1305 stores the maximum 'C' number of logical address groups DLAAx<1:A> detected as a result of operation '1301' among the operations of the controller 130 described with reference to FIG. 12.

Because the command queue 1304 and the detection logic table 1305 are stored in the memory 144 of the controller 130 shown in FIG. 1, the sizes thereof may be easily changed according to various circuit designs. Therefore, the value of each of the reference characters 'B' and 'C' may be selected as any integer greater than 2. The values of reference characters 'B' and 'C' may be determined as having different values or, alternatively, as having the same value.

Referring to FIG. 13B, there is illustrated an example of an operation of the controller 130. According to FIG. 13B, the controller 130 checks a plurality of commands RD_CMDx and WT_CMDx and the values of corresponding logical address groups LAAx<1:A> and then stores logical address groups DLAAx<1:A> having values related to each other in the detection logic table 1305.

In more detail, the controller 130 checks, each time a new read command RD_CMDx is stored in the command queue 1304, whether the values of the logical address group LAAx<1:A> corresponding to the new read command RD_CMDx are related to the values of a 'D' number of logical address groups LAA<1:D><1:A> corresponding to a 'D' number of read commands RD_CMD<1:D> stored in the command queue 1304. If the logical address group LAAx<1:A> has related values as a result of the checking, the logical address group LAAx<1:A> is set as a detected logical address group DLAAx<1:A> and stored in the detection logic table 1305.

In this regard, the memory system 110 supporting the interleaving method may generally distribute and store write data WT_DATAx<1:A> in physical locations that are accessible using interleaving, in response to a write command WT_CMDx. Therefore, the controller 130 may check a related logical address group DLAAx<1:A> only in response to a new read command DR_CMDx to be stored in the command queue 1304.

When there is the possibility of the write data WT_DATAx<1:A> being stored in physical locations that are inaccessible using interleaving, it may be checked whether a related logical address group DLAAx<1:A> is present in the command queue 1304 in response to not only a new read command RD_CMDx but also a new write command WT_CMDx which are stored in the command queue 1304.

For reference, because the maximum 'B' number of read commands RD_CMDx and write commands WT_CMDx are stored in the command queue 1304 in an input sequence thereof, the number of read commands RD_CMDx may be 'B' or less in which case reference character 'D' has a value of 'B' or less. The value of each of 'B' and 'D' may be determined as one integer greater than 2 depending on circuit designs. The values of reference characters 'B' and 'C' may be different or the same.

Hereinbelow, the operation of checking, by the controller 130, whether a related logical address group DLAAx<1:A> is present in the command queue 1304 will be described with reference to FIG. 13B.

First, as an example, we assume that a total of eight commands are stored in the command queue 1304.

Moreover, we assume that a first command stored in the command queue 1304 is a read command RD_CMD1, and a logical address group LAA1<1:8> corresponding to the first command has eight values 64 to 71. That is, the read command RD_CMD1 requests to read and output data RD_DATA1<1:8> stored in eight physical storage locations (not shown) corresponding to the eight values 64 to 71 which range from a start logical address LAA1<1> to an end logical address LAA1<8>.

A second command stored in the command queue 1304 is a read command RD_CMD2, and a logical address group LAA2<1:8> corresponding to the second command has eight values 92 to 99. That is, the read command RD_CMD2 requests to read and output data RD_DATA2<1:8> stored in eight physical storage locations (not shown) corresponding to the eight values 92 to 99 which range from a start logical address LAA2<1> to an end logical address LAA2<8>.

A third command stored in the command queue 1304 is a write command WT_CMD3, and a logical address group LAA3<1:6> corresponding to the third command has six values 81 to 86. That is, the write command WT_CMD3 requests to store write data WT_DATA3<1:6> inputted from the host 102 in six physical storage locations (not shown) corresponding to the six values 81 to 86 which range from a start logical address LAA3<1> to an end logical address LAA3<6>.

A fourth command stored in the command queue 1304 is a read command RD_CMD4, and a logical address group LAA4<1:2> corresponding to the fourth command has two values 48 and 49. That is, the read command RD_CMD4 requests to read and output data RD_DATA4<1:2> stored in two physical storage locations (not shown) corresponding to the two values 48 and 49 which range from a start logical address LAA4<1> to an end logical address LAA4<2>.

A fifth command stored in the command queue 1304 is a read command RD_CMD5, and a logical address group LAA5<1:3> corresponding to the fifth command has three values 24 to 26. That is, the read command RD_CMD5 requests to read and output data RD_DATA5<1:3> stored in three physical storage locations (not shown) corresponding to the three values 24 to 26 which range from a start logical address LAA5<1> to an end logical address LAA5<3>.

A sixth command stored in the command queue 1304 is a read command RD_CMD6, and a logical address group LAA6<1:8> corresponding to the sixth command has eight values 92 to 99. That is, the read command RD_CMD6 requests to read and output data RD_DATA6<1:8> stored in eight physical storage locations (not shown) corresponding to the eight values 92 to 99 which range from a start logical address LAA6<1> to an end logical address LAA6<8>.

A seventh command stored in the command queue 1304 is a read command RD_CMD7, and a logical address group LAA7<1:8> corresponding to the seventh command has eight values 64 to 71. That is, the read command RD_CMD7 requests to read and output data RD_DATA7<1:8> stored in eight physical storage locations (not shown) corresponding to the eight values 64 to 71 which range from a start logical address LAA7<1> to an end logical address LAA7<8>.

An eighth command stored in the command queue 1304 is a read command RD_CMD8, and a logical address group LAA8<1:4> corresponding to the eighth command has four values 32 to 35. That is, the read command RD_CMD8 requests to read and output data RD_DATA8<1:4> stored in four physical storage locations (not shown) corresponding to the four values 32 to 35 which range from a start logical address LAA8<1> to an end logical address LAA8<4>.

It may be seen that, among the above-mentioned eight commands RD_CMD1, RD_CMD2, WT_CMD3, RD_CMD4, RD_CMD5, RD_CMD6, RD_CMD7 and RD_CMD8 stored in the command queue 1304, the values '92 to 99' of the logical address group LAA2<1:8> corresponding to the second read command RD_CMD2 are exactly the same as the values '92 to 99' of the logical address group LAA6<1:8> corresponding to the sixth read command RD_CMD6.

Furthermore, it may be seen that, among the above-mentioned eight commands RD_CMD1, RD_CMD2, WT_CMD3, RD_CMD4, RD_CMD5, RD_CMD6, RD_CMD7 and RD_CMD8 stored in the command queue 1304, the values '64 to 71' of the logical address group LAA1<1:8> corresponding to the first read command RD_CMD1 are exactly the same as the values '64 to 71' of the logical address group LAA7<1:8> corresponding to the seventh read command RD_CMD7.

In this case, the controller 130 stores a detected logical address group DLAAx<1:A> in the detection logic table 1305 in sequence of time at which whether related values are present is detected. Therefore, given the fact that the second read command RD_CMD2 has been inputted prior to the first read command RD_CMD1, a logical address group LAA<1:8> having values '92 to 99' corresponding to the second read command RD_CMD2 and the sixth read command RD_CMD6 is stored as a first detected logical address group DLAA1<1:8> of the detection logic table 1305. Thereafter, a logical address group LAA<1:8> having values '64 to 71' corresponding to the first read command RD_CMD1 and the seventh read command RD_CMD7 is stored as a second detected logical address group DLAA2<1:8> of the detection logic table 1305.

Referring to FIG. 13C, there is illustrated another example of an operation of the controller 130 that checks a plurality of read and write commands RD_CMDx and WT_CMDx and the values of corresponding logic address groups LAAx<1:A> and stores logic address groups DLAAx<1:A> having values related to each other in the detection logic table 1305.

In more detail, the controller 130 checks, each time a new read command RD_CMDx is stored in the command queue 1304, whether the values of the logic address group LAAx<1:A> corresponding to the new read command RD_CMDx are related to the values of the 'D' number of logic address groups LAA<1:D><1:A> corresponding to the 'D' number read commands RD_CMD<1:D> stored in the command queue 1304. If the logic address group LAAx<1:A> has related values as a result of the checking, the logic address group LAAx<1:A> is set as a detected logic address group DLAAx<1:A> and stored in the detection logic table 1305.

In this regard, it may be seen that, along with the detected logical address group DLAAx<1:A>, an iterative detection count THx of the detected logical address group DLAAx<1:A> is stored in the detection logic table 1305. That is, the maximum 'C' number of iterative detection counts THx along with the maximum 'C' number of detected logical address groups DLAAx<1:A> are stored in the detection logic table 1305.

The iterative detection counts THx indicates how many times the detected logical address group DLAAx<1:A> is iteratively detected.

Therefore, the controller 130 checks whether the values of a new-set detected logical address group DLAAx<1:A> are related to the values of the maximum 'C' number of detected logical address groups DLAA<1:C><1:A> stored in the detection logic table 1305. If the new-set detected logical address group DLAAx<1:A> has related values as a result of the checking, the controller 130 does not add the new-set detected logical address group DLAAx<1:A> to the detection logic table 1305, but increases the iterative detection count THx of the corresponding one among the maximum 'C' number of detected logical address groups DLAA<1:C><1:A>.

Hereinbelow, it will be described as an example with reference to FIG. 13C that the controller 130 performs the operation of checking whether a related logical address group LAAx<1:A> is present in the command queue 1304 and the operation of checking whether a related detected logical address group DLAAx<1:A> is present in the detection logic table 1305 and increasing the iterative detection count THx thereof.

First, the eight commands stored in the command queue 1304 at a first time 1ST_TIME have the same conditions as those described with reference to FIG. 13B. Therefore, in the detection logic table 1305 at the first time 1ST_TIME, the logical address group LAA<1:8> having the values '92 to 99' is stored as the first detected logical address group DLAA1<1:A>, and the logical address group LAA<1:8> having the values '64 to 71' is stored as the second detected logical address group DLAA2<1:A>.

It may be seen that, at a second time 2ND_TIME after a predetermined time has passed from the first time 1ST_TIME, the fourth to eighth commands RD_CMD4, RD_CMD5, WT_CMD6, RD_CMD7 and RD_CMD8 among the eight commands stored in the command queue 1304 are the same as the first to fifth commands RD_CMD1, RD_CMD2, WT_CMD3, RD_CMD4 and RD_CMD5 that have been stored in the command queue 1304 at the first time 1ST_TIME.

That is, it may be seen that during the passage of a predetermined time from the first time 1ST_TIME to the second time 2ND_TIME, three commands have been outputted from the command queue 1304 and, simultaneously, three new commands have been stored in the command queue 1304.

In more detail, the new three commands stored in the command queue 1304 during the passage of a predetermined time from the first time 1ST_TIME to the second time 2ND_TIME may be as follows.

A first command stored in the command queue 1304 is a read command RD_CMD1, and a logic address group LAA1<1:8> corresponding to the first command has eight values 64 to 71. That is, the read command RD_CMD1 requests to read and output data RD_DATA1<1:8> stored in eight physical storage locations (not shown) corresponding to the eight values 64 to 71 which range from a start logical address LAA1<1> to an end logical address LAA1<8>.

A second command stored in the command queue 1304 is a read command RD_CMD2, and a logic address group LAA2<1:4> corresponding to the second command has four values 101 to 104. That is, the read command RD_CMD2 requests to read and output data RD_DATA2<1:4> stored in four physical storage locations (not shown) corresponding to the four values 101 to 104 which range from a start logical address LAA2<1> to an end logical address LAA2<4>.

A third command stored in the command queue 1304 is a read command RD_CMD3, and a logic address group LAA3<1:3> corresponding to the third command has three values 24 to 26. That is, the read command RD_CMD3 requests to read and output data RD_DATA3<1:3> stored in three physical storage locations (not shown) corresponding to the three values 24 to 26 which range from a start logical address LAA3<1> to an end logical address LAA3<3>.

It may be seen that, at the above-mentioned second time 2ND_TIME, among the eight commands RD_CMD1, RD_CMD2, RD_CMD3, RD_CMD4, RD_CMD5, WT_CMD6, RD_CMD7 and RD_CMD8 stored in the command queue 1304, the values '64 to 71' of the logical address group LAA1<1:8> corresponding to the first read command RD_CMD1 are completely the same as the values '64 to 71' of the logical address group LAA4<1:8> corresponding to the fourth read command RD_CMD4.

It may be seen that, at the second time 2ND_TIME, among the eight commands RD_CMD1, RD_CMD2, RD_CMD3, RD_CMD4, RD_CMD5, WT_CMD6, RD_CMD7 and RD_CMD8 stored in the command queue 1304, the values '24 to 26' of the logical address group LAA3<1:3> corresponding to the third read command RD_CMD3 are completely the same as the values '24 to 26' of the logical address group LAA8<1:8> corresponding to the eighth read command RD_CMD8.

In this regard, the controller 130 stores a detected logical address group DLAAx<1:A> in the detection logic table 1305 in sequence of time at which whether related values are present is detected. Therefore, given the fact that the third read command RD_CMD3 has been inputted prior to the first read command RD_CMD1, a logical address group LAA<1:3> having values '24 to 26' corresponding to the third read command RD_CMD3 and the eighth read command RD_CMD8 is to be stored in the detection logic table 1305. In this regard, before the logical address group LAA<1:3> having the values '24 to 26' corresponding to the third read command RD_CMD3 and the eighth read command RD_CMD8 is stored, as it is, in the detection logic table 1305, it is checked whether among the values '92 to 99' and '64 to 71' of the detected logical address groups DLAA1<1:8> and DLAA2<1:8> stored in the detection logic table 1305 at the first time 1ST_TIME, a detected logical address group DLAAx<1:A> having the values '24 to 26' is present. As a result of the checking, it may be seen that, among the values '92 to 99' and '64 to 71' of the detected logical address groups DLAA1<1:8> and DLAA2<1:8> stored in the detection logic table 1305 at the first time 1ST_TIME, a detected logical address group DLAAx<1:A> having the values '24 to 26' is not present. Therefore, the controller 130 stores the logical address group LAA<1:3> having the values '24 to 26', detected at the second time 2ND_TIME, in the detection logic table 1305 as a third detected logical address group DLAA3<1:3>.

Thereafter, a logical address group LAA<1:8> having values '64 to 71' corresponding to the first read command RD_CMD1 and the fourth read command RD_CMD4 is to be stored as a detected logical address group DLAAx<1:A>. In this regard, before the logical address group LAA<1:8> having the values '64 to 71' corresponding to the first read command RD_CMD1 and the fourth read command RD_CMD4 is stored, as it is, in the detection logic table 1305, it is checked whether among the values '92 to 99', '64 to 71' and '24 to 26' of the detected logical address groups DLAA1<1:8>, DLAA2<1:8> and DLAA3<1:3> stored in the detection logic table 1305, a detected logical address group DLAAx<1:A> having the values '64 to 71' is present. As a result of the checking, it may be seen that among the values '92 to 99', '64 to 71' and '24 to 26' of the detected logical address groups DLAA1<1:8>, DLAA2<1:8> and DLAA3<1:3> stored in the detection logic table 1305, the values of the second detected logical address group DLAA2<1:A> are '64 to 71'. Therefore, the controller 130 does not add the logical address group LAA<1:8> having the values '64 to 71', detected at the second time 2ND_TIME, to the detection logic table 1305. Instead, the controller 130 increases an iterative detection count TH2 of the second detected logical address group DLAA2<1:8> stored in the detection logic table 1305 from '1' to '2'.

Through the operation described with reference to FIGS. 13A to 13C, the controller 130 is able to store, among the plurality of logical address groups LAA1 to LAAy inputted to perform a read or write operation in the plurality of memory devices 1501<1:4> and 1502<1:4>, logical address groups LAAx<1:A> having values related to each other in the detection logic table 1305 as detected logical address groups DLAAx<1:A>.

After the detected logical address groups DLAAx<1:A> are stored in the detection logic table 1305, the controller 130 checks whether physical storage locations of read data RD_DATAx<1:A> or write data WT_DATAx<1:A> corresponding to the detected logical address groups DLAAx<1:A> in the detection logic table 1305 are accessible using interleaving, in a period in which the memory system 110 enters a standby mode or background operation mode.

In more detail, in the case where the detected logical address groups DLAAx<1:A> are stored in the detection logic table 1305 in the same as that of FIG. 13B, the controller 130 selects the maximum 'C' number of detected logical groups DLAAx<1:A> stored in the detection logic table 1305, one by one sequentially, in the entry period of the standby mode or background operation mode.

Furthermore, in the case where the detected logical address groups DLAAx<1:A> are stored in the detection logic table 1305 in the same as that of FIG. 13C, the controller 130 selects detected logical groups DLAAx<1:A>, the iterative detection count THx of which is equal to or greater than a preset count, one by one sequentially, in the entry period of the standby mode or background operation mode. For example, when a preset value of the iterative detection count THx is '2' in FIG. 13C, only the second detected logical address group DLAA2<1:8> stored in the detection logic table 1305 will be selected, and the other first and third detected logical address groups DLAA1<1:8> and DLAA3<1:3> will not be selected.

In this way, it is checked whether the physical storage locations of the 'A' number of data RD_DATAx<1:A> or WT_DATAx<1:A> corresponding to the 'A' number of logical addresses LAAx<1:A> included in the detected logical address group DLAAx<1:A> selected one by one from the detection logic table 1305 are accessible using interleaving. As a result of the checking, in the case where it is inaccessible using interleaving, the physical storage locations of the 'A' number of data RD_DATAx<1:A> or WT_DATAx<1:A> are adjusted to locations that are accessible using interleaving and then the data RD_DATAx<1:A> or WT_DATAx<1:A> are restored.

For example, if it is checked that all of the 'A' number of data RD_DATAx<1:A> or WT_DATAx<1:A> corresponding to the 'A' number of logical addresses LAAx<1:A> included in the detected logical address group DLAAx<1:A> are stored in the plurality of first memory device 1501<1:4> and thus it is impossible to access to the data RD_DATAx<1:A> or WT_DATAx<1:A> using interleaving, the controller 130 transfers and stores some of the data RD_DATAx<1:A> or WT_DATAx<1:A> to and in the plurality of second memory devices 1502<1:4>.

Since the maximum number of detected logical address groups DLAAx<1:A> that can be stored in the detection logic table 1305 is 'C', the detected logical address groups DLAAx<1:A> corresponding to the 'A' number of data RD_DATAx<1:A> or WT_DATAx<1:A> that have been adjusted in physical locations so as to be accessed using interleaving in the entry period of the standby mode or background operation mode may be erased from the detection logic table 1305.

Figure 14A:
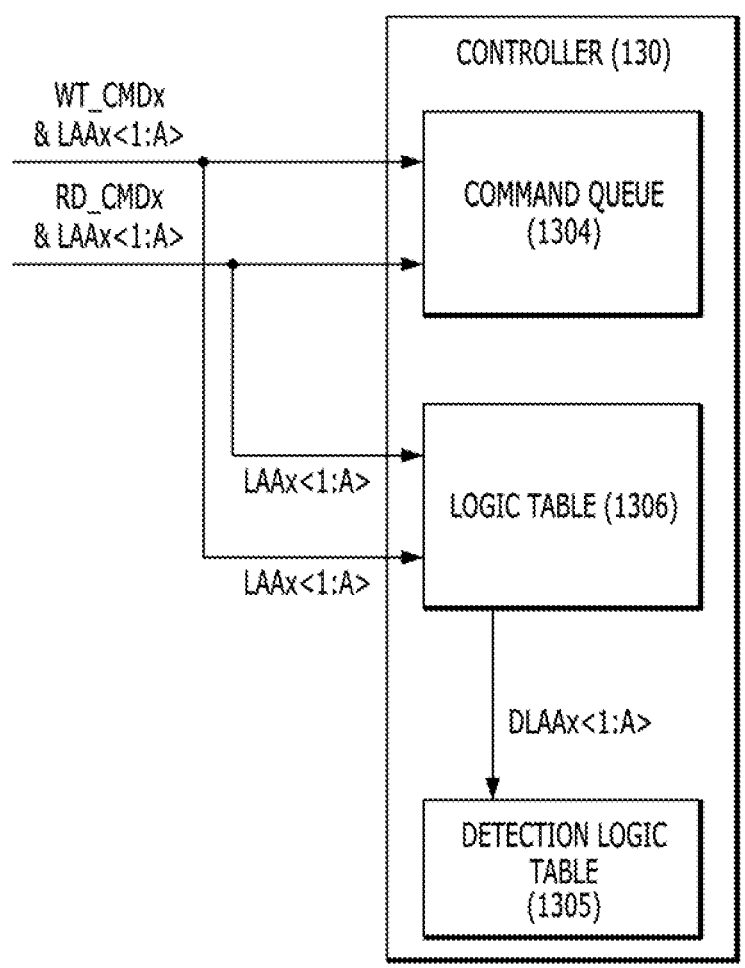
FIGS. 14A to 14D are diagrams describing a detailed operation of the controller in the memory system of FIG. 12, according to another embodiment of the present invention.
Figure 14B:
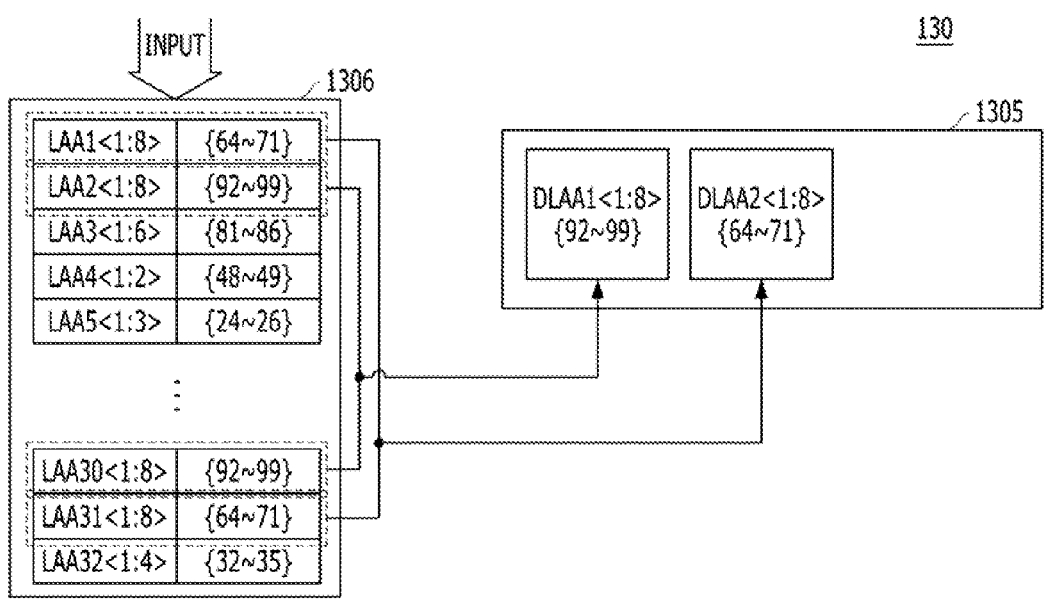
Figure 14C:
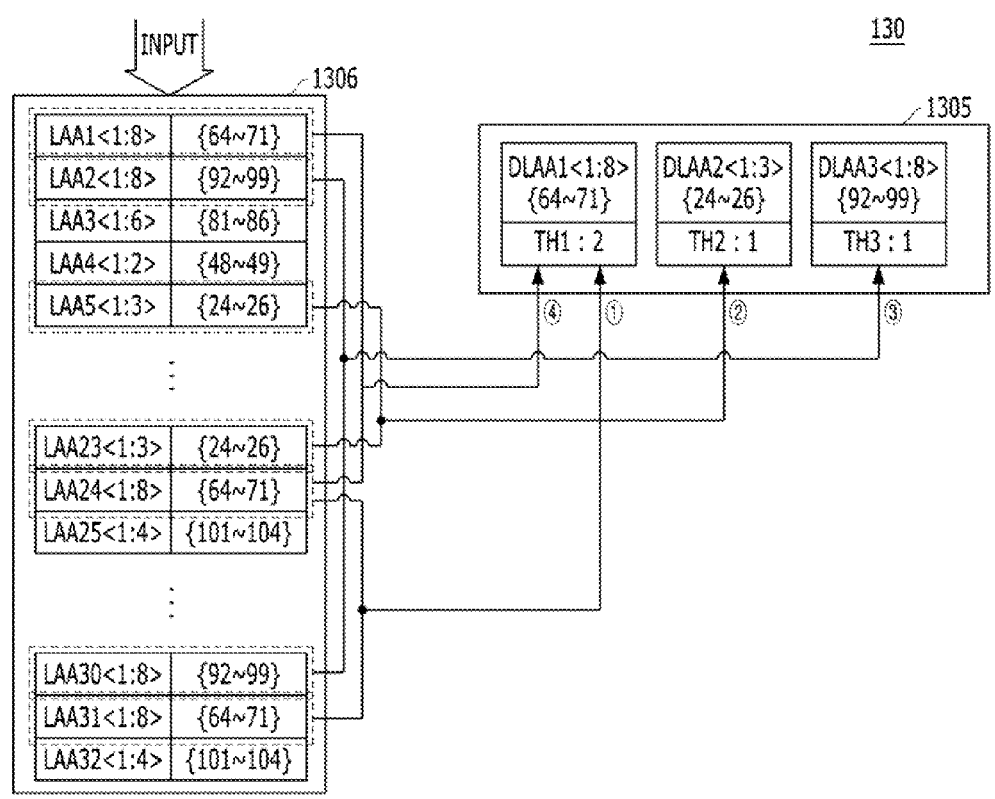

FIGS. 14A to 14C are diagrams describing a detailed operation of the controller 130 in the memory system 110 of FIG. 12, according to another embodiment of the present invention.

Referring to FIG. 14A, the controller 130 may include a command queue 1304, a logic table 1306 and a detection logic table 1305.

The command queue 1304 may store the read commands RD_CMDx or write commands WT_CMDx up to the maximum number of 'B', according to the input sequence of the commands RD_CMDx or WT_CMDx. The plurality of logical address groups LAAx<1:A> respectively correspond to a plurality of commands RD_CMDx and WT_CMDx stored in the command queue 1304. That is, the maximum 'B' number of logical address groups LAAx<1:A> along with the plurality of commands RD_CMDx and WT_CMDx are stored in the command queue 1304.

The logic table 1306 separates and stores only the plurality of logical address groups LAAx<1:A>. That is, the logic table 1306 collects and stores only the logical address groups LAAx<1:A> up to the maximum number of 'E', regardless of whether commands corresponding to the plurality of logical address groups LAAx<1:A> are read commands RD_CMDx or write commands WT_CMDx.

The detection logic table 1305 stores the maximum 'F' number of logical address groups DLAAx<1:A> detected as a result of operation '1301' among the operations of the controller 130 described with reference to FIG. 12.

The command queue 1304, the logic table 1306 and the detection logic table 1305 may be stored in the memory 144 of the controller 130 shown in FIG. 1. Hence, the relative sizes thereof may be readily changed by employing different circuit designs. Therefore, the value of each of reference characters 'B', 'E' and 'F' may be any integer greater than 2. The values of the reference characters 'B', 'E' and 'F' may be different or the same. Although, in the embodiment of FIGS. 13A to 13C, it has been described that the maximum 'C' number of detected logical addresses LAAx<1:A> can be stored in the detection logic table 1305, the reference characters 'C' and 'F' may have the same value or different values.

Referring to FIG. 14B, there is illustrated an example of an operation of the controller 130 that checks the values of the plurality of logical address groups LAA1<1:A>, LAA2<1:A>, . . . LAAx<1:A> and stores logical address groups DLAAx<1:A> having values related to each other in the detection logic table 1305.

In more detail, the controller 130 checks, each time a new logical address group LAAx<1:A> is stored in the logic table 1306, whether the values of the new logical address group LAAx<1:A> are related to the values of the 'E' number of logical address groups LAA<1:E><1:A> stored in the logic table 1306. If the new logical address group LAAx<1:A> has related values as a result of the checking, the new logical address group LAAx<1:A> is set as a detected logical address group DLAAx<1:A> and stored in the detection logic table 1305.

Hereinbelow, the operation of checking, by the controller 130, whether a related logical address group DLAAx<1:A> is present in the logic table 1306 will be described with reference to FIG. 14B.

First, a total of thirty-two logical address groups LAA1<1:8>, LAA2<1:8>, LAA3<1:6>, LAA4<1:2>, LAA5<1:3>, . . . , LAA30<1:8>, LAA31<1:8>, and LAA32<1:4> are shown stored in the logic table 1306 as an example.

Among the thirty-two logical address groups, detailed information of the first to the fifth logical address groups LAA<1:5><1:A> and of the thirtieth to the thirty-second logical address groups LAA<30:32><1:A> is as follows.

The first logical address group LAA1<1:8> stored in the logic table 1306 has eight values 64 to 71. That is, the first logical address group LAA1<1:8> has eight values 64 to 71 which range from a start logical address LAA1<1> to an end logical address LAA1<8>.

The second logical address group LAA2<1:8> stored in the logic table 1306 has eight values 92 to 99. That is, the second logical address group LAA2<1:8> has eight values 92 to 99 which range from a start logical address LAA2<1> to an end logical address LAA2<8>.

The third logical address group LAA3<1:6> stored in the logic table 1306 has six values 81 to 86. That is, the third logical address group LAA3<1:6> has six values 81 to 86 which range from a start logical address LAA3<1> to an end logical address LAA3<6>.

The fourth logical address group LAA4<1:2> stored in the logic table 1306 has two values 48 and 49. That is, the fourth logical address group LAA4<1:2> has two values 48 and 49 which range from a start logical address LAA4<1> to an end logical address LAA4<2>.

The fifth logical address group LAA5<1:3> stored in the logic table 1306 has three values 24 to 26. That is, the fifth logical address group LAA5<1:3> has three values 24 to 26 which range from a start logical address LAA5<1> to an end logical address LAA5<3>.

The thirtieth logical address group LAA30<1:8> stored in the logic table 1306 has eight values 92 to 99. That is, the thirtieth logical address group LAA30<1:8> has eight values 92 to 99 which range from a start logical address LAA30<1> to an end logical address LAA30<8>.

The thirty-first logical address group LAA31<1:8> stored in the logic table 1306 has eight values 64 to 71. That is, the thirty-first logical address group LAA31<1:8> has eight values 64 to 71 which range from a start logical address LAA31<1> to an end logical address LAA31<8>.

The thirty-second logical address group LAA32<1:4> stored in the logic table 1306 has four values 32 to 35. That is, the thirty-second logical address group LAA32<1:4> has four values 32 to 35 which range from a start logical address LAA32<1> to an end logical address LAA32<4>.

It may be seen that, among the thirty-two logical address groups LAA1<1:8>, LAA2<1:8>, LAA3<1:6>, LAA4<1:2>, LAA5<1:3>, . . . , LAA30<1:8>, LAA31<1:8>, and LAA32<1:4> stored in the above-mentioned logic table 1306, the values '92 to 99' of the second logical address group LAA2<1:8> are completely the same as the values '92 to 99' of the thirtieth logical address group LAA30<1:8>.

It may be seen that, among the thirty-two logical address groups LAA1<1:8>, LAA2<1:8>, LAA3<1:6>, LAA4<1:2>, LAA5<1:3>, . . . , LAA30<1:8>, LAA31<1:8>, and LAA32<1:4> stored in the logic table 1306, the values '64 to 71' of the first logical address group LAA1<1:8> are completely the same as the values '64 to 71' of the thirty-first logical address group LAA31<1:8>.

The controller 130 then stores a detected logical address group DLAAx<1:A> in the detection logic table 1305 according to the sequence of time at which the presence of related values is detected. Therefore, when the second logical address group LAA2<1:8> has been inputted prior to the first logical address group LAA1<1:8>, a logical address group LAA<1:8> having values '92 to 99' corresponding to the second logical address group LAA2<1:8> and the thirtieth logical address group LAA30<1:8> is stored as a first detected logical address group DLAA1<1:8> of the detection logic table 1305. Thereafter, a logical address group LAA<1:8> having values '64 to 71' corresponding to the first logical address group LAA1<1:8> and the thirty-first logical address group LAA31<1:8> is stored as a second detected logical address group DLAA2<1:8> of the detection logic table 1305.

Referring to FIG. 14C, there is illustrated another example of an operation of the controller 130 that checks values of the plurality of logical address groups LAA1<1: A>, LAA2<1:A>, . . . LAAx<1:A> and stores logical address groups DLAAx<1:A> having values related to each other in the detection logic table 1305.

In more detail, the controller 130 checks, each time a new logical address group LAAx<1:A> is stored in the logic table 1306, whether the values of the new logical address group LAAx<1:A> are related to the values of the 'E' number of logical address groups LAA<1:E><1:A> stored in the logic table 1306. If the new logical address group LAAx<1:A> has related values as a result of the checking, the new logical address group LAAx<1:A> is set as a detected logical address group DLAAx<1:A> and stored in the detection logic table 1305.

In this regard, it may be seen that, along with the detected logical address group DLAAx<1:A>, an iterative detection count THx of the detected logical address group DLAAx<1:

A> is stored in the detection logic table 1305. That is, the maximum 'F' number of iterative detection counts THx along with the maximum 'F' number of detected logical address groups DLAAx<1:A> are stored in the detection logic table 1305.

The iterative detection counts THx indicates how many times the detected logical address group DLAAx<1:A> has been iteratively detected.

Therefore, the controller 130 checks whether the values of a new detected logical address group DLAAx<1:A> are related to the values of the maximum 'F' number of detected logical address groups DLAA<1:F><1:A> stored in the detection logic table 1305. If the new detected logical address group DLAAx<1:A> has related values as a result of the checking, the controller 130 does not add the new detected logical address group DLAAx<1:A> to the detection logic table 1305, but increases the iterative detection count THx of the corresponding one among the maximum 'C' number of detected logical address groups DLAA<1:><1:A>.

Hereinbelow, it will be described as an example with reference to FIG. 14C that the controller 130 performs the operation of checking whether a related logical address group LAAx<1:A> is present in the logic table 1306 and the operation of checking whether a related detected logical address group DLAAx<1:A> is present in the detection logic table 1305 and increasing the iterative detection count THx thereof.

First, a total of thirty-two logical address groups LAA1<1:8>, LAA2<1:8>, LAA3<1:6>, LAA4<1:2>, LAA5<1:3>, . . . , LAA23<1:3>, LAA24<1:8>, LAA25<1:4>, . . . , LAA30<1:8>, LAA31<1:8>, and LAA32<1:4> are stored in the logic table 1306.

Among them, detailed information of first to fifth logical address groups LAA<1:5><1:A>, twenty-third to twenty-fifth logical address groups LAA<23:25><1:A>, and thirtieth to thirty-second logical address groups LAA<30:32><1:A> is as follows.

The first logical address group LAA1<1:8> stored in the logic table 1306 has eight values 64 to 71. That is, the first logical address group LAA1<1:8> has eight values 64 to 71 which range from a start logical address LAA1<1> to an end logical address LAA1<8>.

The second logical address group LAA2<1:8> stored in the logic table 1306 has eight values 92 to 99. That is, the second logical address group LAA2<1:8> has eight values 92 to 99 which range from a start logical address LAA2<1> to an end logical address LAA2<8>.

The third logical address group LAA3<1:6> stored in the logic table 1306 has six values 81 to 86. That is, the third logical address group LAA3<1:6> has six values 81 to 86 which range from a start logical address LAA3<1> to an end logical address LAA3<6>.

The fourth logical address group LAA4<1:2> stored in the logic table 1306 has two values 48 and 49. That is, the fourth logical address group LAA4<1:2> has two values 48 and 49 which range from a start logical address LAA4<1> to an end logical address LAA4<2>.

The fifth logical address group LAA5<1:3> stored in the logic table 1306 has three values 24 to 26. That is, the fifth logical address group LAA5<1:3> has three values 24 to 26 which range from a start logical address LAA5<1> to an end logical address LAA5<3>.

The twenty-third logical address group LAA23<1:3> stored in the logic table 1306 has three values 24 to 26. That is, the twenty-third logical address group LAA23<1:3> has three values 24 to 26 which range from a start logical address LAA23<1> to an end logical address LAA23<3>.

The twenty-fourth logical address group LAA24<1:8> stored in the logic table 1306 has eight values 64 to 71. That is, the twenty-fourth logical address group LAA24<1:8> has eight values 64 to 71 which range from a start logical address LAA24<1> to an end logical address LAA24<8>.

The twenty-fifth logical address group LAA25<1:4> stored in the logic table 1306 has four values 101 to 104. That is, the twenty-fifth logical address group LAA25<1:4> has eight values 101 to 104 which range from a start logical address LAA25<1> to an end logical address LAA25<4>.

The thirtieth logical address group LAA30<1:8> stored in the logic table 1306 has eight values 92 to 99. That is, the thirtieth logical address group LAA30<1:8> has eight values 92 to 99 which range from a start logical address LAA30<1> to an end logical address LAA30<8>.

The thirty-first logical address group LAA31<1:8> stored in the logic table 1306 has eight values 64 to 71. That is, the thirty-first logical address group LAA31<1:8> has eight values 64 to 71 which range from a start logical address LAA31<1> to an end logical address LAA31<8>.

The thirty-second logical address group LAA32<1:4> stored in the logic table 1306 has four values 32 to 35. That is, the thirty-second logical address group LAA32<1:4> has four values 32 to 35 which range from a start logical address LAA32<1> to an end logical address LAA32<4>.

It may be seen that, among the above-mentioned thirty-two logical address groups LAA1<1:8>, LAA2<1:8>, LAA3<1:6>, LAA4<1:2>, LAA5<1:3>, . . . , LAA23<1:3>, LAA24<1:8>, LAA25<1:4>, . . . , LAA30<1:8>, LAA31<1:8>, and LAA32<1:4>, the values '64 to 71' of the first logical address group LAA1<1:8> are completely the same as the values '64 to 71' of the twenty-fourth logical address group LAA24<1:8> and also are completely the same as the values '64 to 71' of the thirty-first logical address group LAA31<1:8>.

Furthermore, it may be seen that, among the above-mentioned thirty-two logical address groups LAA1<1:8>, LAA2<1:8>, LAA3<1:6>, LAA4<1:2>, LAA5<1:3>, . . . , LAA23<1:3>, LAA24<1:8>, LAA25<1:4>, . . . , LAA30<1:8>, LAA31<1:8>, and LAA32<1:4>, the values '92 to 99' of the second logical address group LAA2<1:8> are completely the same as the values '92 to 99' of the thirtieth logical address group LAA30<1:8>.

Also, it may be seen that, among the above-mentioned thirty-two logical address groups LAA1<1:8>, LAA2<1:8>, LAA3<1:6>, LAA4<1:2>, LAA5<1:3>, . . . , LAA23<1:3>, LAA24<1:8>, LAA25<1:4>, . . . , LAA30<1:8>, LAA31<1:8>, and LAA32<1:4>, the values '24 to 26' of the fifth logical address group LAA5<1:3> are completely the same as the values '24 to 26' of the twenty-third logical address group LAA23<1:3>.

The controller 130 stores a detected logical address group DLAAx<1:A> in the detection logic table 1305 in sequence of time at which the presence of related values is detected. Therefore, a logical address group LAA<1:8> having the values '64 to 71' corresponding to the twenty-fourth logical address group LAA24<1:8> and the thirty-first logical address group LAA31<1:8> is to be stored in the detection logic table 1305 (see '①'). Here, because the detection logic table 1305 is in an empty state, the logical address group LAA<1:8> having values '64 to 71' is stored, as it is, in the detection logic table 305 as a first detected logical address group DLAA1<1:8>. Therefore, the iterative detection count TH1 of the first detected logical address group DLAA1<1:8> is '1'.

Thereafter, a logical address group LAA<1:3> having the values '24 to 26' corresponding to the fifth logical address group LAA5<1:3> and the twenty-third logical address group LAA23<1:3> is to be stored in the detection logic table 1305 (see '②'). Here, because only the first detected logical address group DLAA1<1:8> having the values '64 to 71' is stored in the detection logic table 1305 and the values '64 to 71' are different from the values '24 to 26' of the new logical address group LAA<1:3> to be stored, the logical address group LAA<1:3> having the values '24 to 26' is stored, as it is, in the detection logic table 1305 as a second detected logical address group DLAA2<1:3>. Therefore, the iterative detection count TH2 of the second detected logical address group DLAA2<1:3> is '1'.

Thereafter, a logical address group LAA<1:8> having the values '92 to 99' corresponding to the second logical address group LAA2<1:8> and the thirtieth logical address group LAA30<1:8> is stored in the detection logic table 1305 (see '③'). Here, because the first detected logical address group DLAA1<1:8> having the values '64 to 71' and the second detected logical address group DLAA2<1:3> having the values '24 to 26' are stored in the detection logic table 1305 and the values '64 to 71' or '24 to 26' are different from the values '92 to 99' of the new logical address group LAA<1:8> to be stored, the logical address group LAA<1:8> having the values '92 to 99' is stored, as it is, in the detection logic table 1305 as a third detected logical address group DLAA3<1:8>. Therefore, the iterative detection count TH2 of the third detected logical address group DLAA3<1:8> is '1'.

Thereafter, a logical address group LAA<1:8> having the values '64 to 71' corresponding to the first logical address group LAA1<1:8> and the twenty-fourth logical address group LAA24<1:8> is to be stored in the detection logic table 1305 (see '④'). Here, the first detected logical address group DLAA1<1:8> having the values '64 to 71', the second detected logical address group DLAA2<1:3> having the values '24 to 26', and the third detected logical address group DLAA3<1:8> having the values '92 to 99' are stored in the detection logic table 1305. Among them, the values '64 to 71' of the first detected logical address group DLAA1<1:8> are the same as the values '64 to 71' of the new logical address group LAA<1:8> to be stored. Therefore, the logical address group LAA<1:8> having the values '64 to 71' is not added to the detection logic table 1305. Instead, the controller 130 increases the iterative detection count TH1 of the first detected logical address group DLAA1<1:8> stored in the detection logic table 1305 from '1' to '2'.

Through the operation described with reference to FIGS. 14A to 14C, the controller 130 is able to store, among the plurality of logical address groups LAA1 to LAAy inputted to perform a read or write operation in the plurality of memory devices 1501<1:4> and 1502<1:4>, logical address groups LAAx<1:A> having values related to each other in the detection logic table 1305 as a detected logical address group DLAAx<1:A>.

After the detected logical address group DLAAx<1:A> is stored in the detection logic table 1305, the controller 130 checks whether physical storage locations of read data RD_DATAx<1:A> or write data WT_DATAx<1:A> corresponding to the detected logical address group DLAAx<1:A> in the detection logic table 1305 are accessible using interleaving, in a period in which the memory system 110 enters a standby mode or background operation mode.

In more detail, in the case where the detected logical address groups DLAAx<1:A> are stored in the detection logic table 1305 in the same as that of FIG. 14B, the controller 130 selects the maximum 'F' number of detected logical groups DLAAx<1:A> stored in the detection logic table 1305, one by one sequentially, in the entry period of the standby mode or background operation mode.

Furthermore, in the case where the detected logical address groups DLAAx<1:A> are stored in the detection logic table 1305 in the same as that of FIG. 14C, the controller 130 selects detected logical groups DLAAx<1:A>, the iterative detection count THx which is equal to or greater than a preset count, one by one sequentially, in the entry period of the standby mode or background operation mode. For example, when a preset value of the iterative detection count THx of FIG. 14C is '2', only the first detected logical address group DLAA1<1:8> stored in the detection logic table 1305 will be selected, but the other second and third detected logical address groups DLAA2<1:3> and DLAA3<1:8> will not be selected.

It is checked whether the physical storage locations of the 'A' number of data RD_DATAx<1:A> or WT_DATAx<1:A> corresponding to the 'A' number of logical addresses LAAx<1:A> included in the detected logical address group DLAAx<1:A> selected one by one from the detection logic table 1305 are accessible using interleaving. As a result of the checking, if inaccessible using interleaving, the physical storage locations of the 'A' number of data RD_DATAx<1:A> or WT_DATAx<1:A> are adjusted to locations that are accessible using interleaving and then the data RD_DATAx<1:A> or WT_DATAx<1:A> are restored.

For example, if it is checked that all of the 'A' number of data RD_DATAx<1:A> or WT_DATAx<1:A> corresponding to the 'A' number of logical addresses LAAx<1:A> included in the detected logical address group DLAAx<1:A> are stored in the plurality of first memory device 1501<1:4> and thus it is impossible to access the data RD_DATAx<1:A> or WT_DATAx<1:A> using interleaving, the controller 130 transfers and stores some of the data RD_DATAx<1:A> or WT_DATAx<1:A> to and in the plurality of second memory devices 1502<1:4>.

For reference, since the maximum number of detected logical address groups DLAAx<1:A> that can be stored in the detection logic table 1305 is 'F', the detected logical address group DLAAx<1:A> corresponding to the 'A' number of data RD_DATAx<1:A> or WT_DATAx<1:A> that have been adjusted in physical locations so as to be accessed using interleaving in the entry period of the standby mode or background operation mode may be erased from the detection logic table 1305.

Figure 14D:
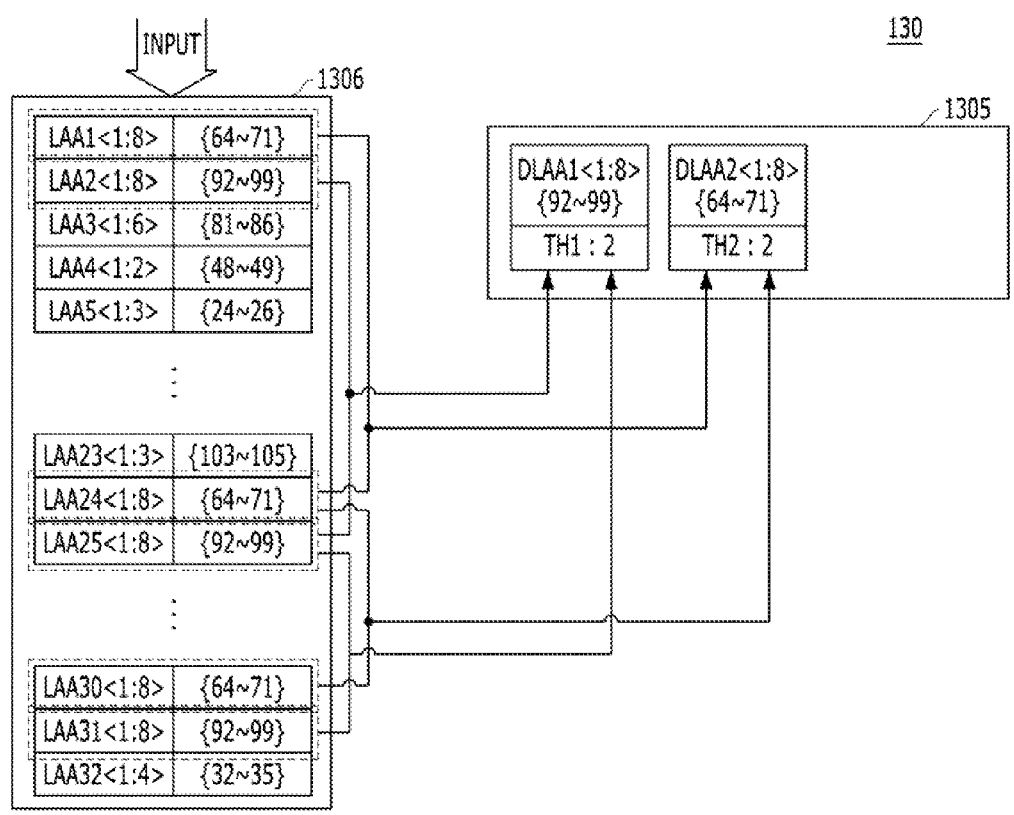

Referring to FIG. 14D, it may be seen that if, among a plurality of logical address groups LAA1<1:A>, LAA2<1:A>, . . . LAAx<1:A> stored in the logic table 1306, all of a 'G' number of logical address groups LAAx<1:A> that have been successively inputted and stored are stored in the detection logic table 1305, the controller 130 collectively manages the 'G' number of logical address groups LAAx<1:A>. For reference, the value of 'G' may be determined as any integer greater than 2 depending on circuit design.

In more detail, an operation of storing detected logical address groups DLAAx<1:A> in the detection logic table 1305 in the case of FIG. 14D is the same as that described in FIG. 14C. However, in the case of FIG. 14O, it may be seen that two logical address groups that are successively inputted in the logic table 1306 are iteratively inputted and all of them are stored in the detection logic table 1305.

The first logical address group LAA1<1:8> stored in the logic table 1306 has eight values 64 to 71. That is, the first logical address group LAA1<1:8> has eight values 64 to 71 which range from a start logical address LAA1<1> to an end logical address LAA1<8>.

The second logical address group LAA2<1:8> stored in the logic table 1306 has eight values 92 to 99. That is, the second logical address group LAA2<1:8> has eight values 92 to 99 which range from a start logical address LAA2<1> to an end logical address LAA2<8>.

The twenty-fourth logical address group LAA24<1:8> stored in the logic table 1306 has eight values 64 to 71. That is, the twenty-fourth logical address group LAA24<1:8> has eight values 64 to 71 which range from a start logical address LAA24<1> to an end logical address LAA24<8>.

The twenty-fifth logical address group LAA25<1:8> stored in the logic table 1306 has eight values 92 to 99. That is, the twenty-fifth logical address group LAA25<1:8> has eight values 92 to 99 which range from a start logical address LAA25<1> to an end logical address LAA25<8>.

The thirtieth logical address group LAA30<1:8> stored in the logic table 1306 has eight values 64 to 71. That is, the thirtieth logical address group LAA30<1:8> has eight values 64 to 71 which range from a start logical address LAA30<1> to an end logical address LAA30<8>.

The thirty-first logical address group LAA31<1:8> stored in the logic table 1306 has eight values 92 to 99. That is, the thirty-first logical address group LAA31<1:8> has eight values 92 to 99 which range from a start logical address LAA31<1> to an end logical address LAA31<8>.

As described above, it may be seen that the logical address groups LAA1<1:8>, LAA24<1:8> and LAA30<1:8> having the values '64 to 71' and the logical address groups LAA2<1:8>, LAA25<1:8> and LAA31<1:8> having the values '92 to 99' are successively inputted.

Therefore, a first detected logical address group DLAA1<1:8> corresponding to the logical address groups LAA2<1:8>, LAA25<1:8> and LAA31<1:8> having the values '92 to 99' is stored in the detection logic table 1305, and an iterative detection count TH1 of the first detected logical address group DLAA1<1:8> is '2'. Likewise, a second detected logical address group DLAA2<1:8> corresponding to the logical address groups LAA1<1:8>, LAA24<1:8> and LAA30<1:8> having the values '64 to 71' is stored in the detection logic table 1305, and an iterative detection count TH2 of the second detected logical address group DLAA2<1:8> is '2'.

In this way, it may be seen that the logical address groups LAA1<1:8>, LAA24<1:8> and LAA30<1:8> having the values '64 to 71' and the logical address groups LAA2<1:8>, LAA25<1:8> and LAA31<1:8> having the values '92 to 99' that are always successively inputted are stored in the detection logic table 1305 and have the iterative detection count THx which is greater than '2' that is a preset count value.

Therefore, the controller 130 checks whether, in a period in which the memory system 110 enters a standby mode or background operation mode, physical storage locations of a total of sixteen data DATA<1:16> that correspond both to the eight logical addresses LAA<1:8> corresponding to the first detected logical address group DLAA1<1:8> and to the eight logical addresses LAA<1:8> corresponding to the second detected logical address group DLAA2<1:8> are accessible using interleaving. As a result of the checking, if inaccessible using interleaving, the physical storage locations of the sixteen data DATA<1:16> are adjusted to locations that are accessible using interleaving, and the data DATA<1:16> is restored.

In brief, the controller 130 checks whether, among the maximum 'E' number of logical address groups LAA<1:E><1:A> included in the logic table 1306, all of the 'G' number of logical address groups LAA<1:G><1:A> that have been successively inputted and stored, are stored in the detection logic table 1305 and have iterative detection counts THx greater than the preset count value, in the period in which the memory system 110 enters the standby mode or background operation mode. If all of the logical address groups LAA<1:G><1:A> are stored in the detection logic table 1305 and have iterative detection counts THx greater than the preset count as a result of the checking, the controller 130 checks whether physical storage locations of the 'G*A' number of data RD_DATA<1:G><1:A> or WT_DATA<1:G><1:A> corresponding to the 'G*A' number of logical addresses LAA<1:G><1:A> included in the 'G' number of logical address groups LAA<1:G><1:A> are accessible using interleaving. As a result of the re-checking, if inaccessible using interleaving, the physical storage locations of the 'G*A' number of data RD_DATA<1:G><1:A> or WT_DATA<1:G><1:A> are adjusted to locations that are accessible using interleaving, and the data RD_DATA<1:G><1:A> or WT_DATA<1:G><:A> are restored.

As described above, in an embodiment, among a plurality of logical address groups requested from a host, logical address groups having values related to each other are detected. If logical addresses included in a detected logical address group are inaccessible using interleaving, physical storage locations of the logical addresses included in the detected logical address group are adjusted to locations which are accessible using interleaving, and then the data of the logical addresses is stored in adjusted locations.

In this way, data corresponding to logical addresses which are frequently requested from the host may be stored in physical locations which are accessible using interleaving, whereby the efficiency of the interleaving operation may be maximized.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a plurality of memory devices; and
   a controller suitable for detecting whether, among a plurality of logical address groups inputted to perform a read or write operation in the plurality of memory devices, first logical address groups having values related to each other are inputted, and for adjusting, when physical storage locations of data corresponding to logical addresses of the first logical address groups are inaccessible using interleaving, the physical storage locations of the data to locations that are accessible using interleaving and store the data in adjusted locations.

2. The memory system of claim 1, wherein each of the plurality of logical address groups:
   corresponds to one read command or one write command; and
   includes an A number of successive logical addresses, wherein a value of the A varies depending on a size of corresponding data.

3. The memory system of claim 2, wherein the controller comprises:
   a command queue suitable for storing read commands or write commands and logical address groups corresponding thereto in an input sequence of the read commands or write commands up to a number of B, wherein the B is an integer of 2 or more; and a detection logic table suitable for storing the first logical address groups up to a number of C, wherein the C is an integer of 2 or more, wherein the controller checks, each time a new read command is stored in the command queue, whether a new logical address group corresponding to the new read command has related values to the logical address groups already stored in the command queue, sets the new logical address group as a new detected logical address group when the new logical address group has related values, and stores the new detected logical address group as the first logical address group in the detection logic table.

4. The memory system of claim 3, wherein the controller stores the first logical address groups and respective iterative detection counts thereof in the detection logic table up to the number of C, and wherein when the new detected logical address group has related values to the first logical address groups, the controller increases an iterative detection count of corresponding one among the first logical address groups without storing the new detected logical address group in the detection logic table.

5. The memory system of claim 4, wherein the controller:

selects, in an entry period of a standby or background operation mode, a second logical address group, the iterative detection count of which is equal to or greater than a preset count among the first logical address groups;

checks whether physical storage locations of an A number of data corresponding to an A number of logical addresses included in the second logical address group are accessible using interleaving; and adjusts, when the physical storage locations are inaccessible using interleaving as a result of the checking, the physical storage locations of the A number of data corresponding to the second logical address group to locations that are accessible using interleaving, and restores the data in adjusted locations.

6. The memory system of claim 2, wherein the controller comprises:

a logic table suitable for storing the plurality of logical address groups in an input sequence thereof up to a number of E, wherein the E is an integer of 2 or more; and a detection logic table suitable for storing the first logical address groups up to a number of F, wherein the F is an integer of 2 or more, wherein the controller checks, each time a new logical address group is stored in the logic table, whether the new logical address group has related values to the logical address groups stored in the logic table, sets the new logical address group as a new detected logical address group when the new logical address group has the related values, and stores the new detected logical address group as the first logical address groups in the detection logic table.

7. The memory system of claim 6, wherein the controller stores the first logical address groups and respective iterative detection counts thereof in the detection logic table up to the number of F, and wherein when the new detected logical address group has related values to the first logical address groups, the controller increases an iterative detection count of corresponding one among the first logical address groups without storing the new detected logical address group in the detection logic table.

8. The memory system of claim 7, wherein the controller:

selects, in an entry period of a standby or background operation mode, a second logical address group, the iterative detection count of which is equal to or greater than a preset count among the first logical address group;

checks whether physical storage locations of an A number of data corresponding to an A number of logical addresses included in the second logical address group is accessible using interleaving, and adjusts, when the physical storage locations are inaccessible using interleaving as a result of the checking, the physical storage locations of the A number of data corresponding to the second logical address group to locations that are accessible using interleaving, and restores the data in adjusted locations.

9. The memory system of claim 7, wherein the controller:

detects a G number of logical address groups that are successively inputted and stored in the detection logic table and have iterative detection counts greater than a preset count in an entry period of a standby or background operation mode, wherein the G is an integer of 2 or more;

checks whether physical storage locations of a G*A number of data corresponding to a G*A number of logical addresses included in the G number of logical address groups are accessible using interleaving; and adjusts, when the physical storage locations are inaccessible using interleaving as a result of the checking, the physical storage locations of the G*A number of data corresponding to the G number of logical address groups to locations that are accessible using interleaving, and restores the data in adjusted locations.

10. The memory system of claim 1, wherein the controller determines that the first logical address groups have values related to each other:

when start logical addresses of the first logical address groups have the same value, and sizes of data of the first logical address groups are the same as each other; or when a part or all of logical addresses included in the first logical address groups completely match each other.

11. A method of operating a memory system including a plurality of memory devices, comprising:

detecting whether, among a plurality of logical address groups inputted to perform a read or write operation in the plurality of memory devices, first logical address groups having values related to each other are inputted; and adjusting, when physical storage locations of data corresponding to logical addresses of the first logical address groups are inaccessible using interleaving, the physical storage locations of the data to locations that are accessible using interleaving, and storing the data in adjusted locations.

12. The method of claim 11, wherein each of the plurality of logical address groups:

corresponds to one read command or one write command; and includes an A number of successive logical addresses, wherein a value of the A varies depending on a size of corresponding data.

13. The memory system of claim 12, wherein the memory system further includes:

a command queue suitable for storing read commands or write commands and logical address groups corresponding thereto in an input sequence of the read commands or write commands up to a number of B, wherein the B is an integer of 2 or more; and a detection logic table suitable for storing the first logical address groups up to a number of C, wherein the C is an integer of 2 or more, wherein the detecting of the first logical address groups comprises:

checking, each time a new read command is stored in the command queue, whether a new logical address group corresponding to the new read command has related values to the logical address groups stored in the command queue;

setting the new logical address group as a new detected logical address group when the new logical address group has the related values; and storing the new detected logical address group as the first logical address groups in the detection logic table.

14. The method of claim 13, wherein the detection logic table stores the first logical address groups and respective iterative detection counts thereof up to the number of C, and wherein the storing of the new detected logical address group comprises increasing, when the new detected logical address group has related values to the first logical address groups, an iterative detection count of corresponding one among the first logical address groups, without adding the new detected logical address group to the detection logic table.

15. The method of claim 14, wherein the adjusting and storing comprises:

selecting, in an entry period of a standby or background operation mode, a second logical address group, the iterative detection count of which is equal to or greater than a preset count among the first logical address groups;

checking whether physical storage locations of an A number of data corresponding to an A number of logical addresses included in the second logical address group are accessible using interleaving; and adjusting, when the physical storage locations are inaccessible using interleaving as a result of the checking, the physical storage locations of the A number of data corresponding to the second logical address group to locations that are accessible using interleaving, and restoring the data in adjusted locations.

16. The method of claim 12, wherein the memory system further includes:

a logic table suitable for storing the plurality of logical address groups in an input sequence thereof up to a number of E, wherein the E is an integer of 2 or more; and a detection logic table suitable for storing the first logical address groups up to a number of F, wherein the F is an integer of 2 or more, wherein the detecting of the first logical address groups comprises:

checking, each time a new logical address group is stored in the logic table, whether the new logical address group has related values to the logical address groups stored in the logic table;

setting the new logical address group as a new detected logical address group when the new logical address group has the related values; and storing the new detected logical address group as the first logical address groups in the detection logic table.

17. The method of claim 16, wherein the detection logic table stores the first logical address groups and respective iterative detection counts thereof up to the number of F, wherein the storing of the new detected logical address group comprises increasing, when the new detected logical address group has related value to the first logical address groups, an iterative detection count of corresponding one among the first logical address groups, without adding the new detected logical address group to the detection logic table.

18. The method of claim 17, wherein the adjusting and storing comprises:

selecting, in an entry period of a standby or background operation mode, a second logical address group, the iterative detection count of which is equal to or greater than a preset count among the first logical address groups;

checking whether physical storage locations of an A number of data corresponding to an A number of logical addresses included in the second logical address group are accessible using interleaving; and adjusting, when the physical storage locations are inaccessible using interleaving as a result of the checking, the physical storage locations of the A number of data corresponding to the second logical address group to locations that are accessible using interleaving, and restoring the data in adjusted locations.

19. The method of claim 17, wherein the adjusting and storing comprises:

detecting a G number of logical address groups that are successively inputted and stored in the detection logic table and have iterative detection counts greater than a preset count in an entry period of a standby or background operation mode, wherein the G is an integer of 2 or more;

checking whether physical storage locations of a G*A number of data corresponding to a G*A number of logical addresses included in the G number of logical address groups are accessible using interleaving; and adjusting, when the physical storage locations are inaccessible using interleaving as a result of the checking, the physical storage locations of the G*A number of data corresponding to the G number of logical address groups to locations that are accessible using interleaving, and restoring the data in adjusted locations.

20. The method of claim 11, wherein the detecting of the first logical address groups comprises:

determining that the first logical address groups have values related each other:

when start logical addresses of the first logical address groups have the same value, and sizes of data of the first logical address groups are the same as each other; or when a part or all of logical addresses included in the first logical address groups completely match each other.

* * * * *